(12) United States Patent
Nakai

(10) Patent No.: US 7,803,900 B2
(45) Date of Patent: *Sep. 28, 2010

(54) THERMOPLASTIC RESIN FILM AND METHOD FOR PRODUCING THE SAME

(75) Inventor: Shinichi Nakai, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 96 days.

This patent is subject to a terminal disclaimer.

(21) Appl. No.: 12/088,687

(22) PCT Filed: Sep. 27, 2006

(86) PCT No.: PCT/JP2006/319819

§ 371 (c)(1),
(2), (4) Date: Mar. 29, 2008

(87) PCT Pub. No.: WO2007/037502

PCT Pub. Date: Apr. 5, 2007

(65) Prior Publication Data

US 2009/0268292 A1    Oct. 29, 2009

(30) Foreign Application Priority Data

Sep. 29, 2005   (JP) ................ 2005-285112

(51) Int. Cl.
*C08F 6/00* (2006.01)
*C08G 63/00* (2006.01)

(52) U.S. Cl. .................. 528/481; 264/1.34; 264/211.2; 359/500; 428/411.1; 528/480

(58) Field of Classification Search ........... 264/1.34, 264/211.2; 359/500; 528/480, 481; 428/411.1
See application file for complete search history.

(56) References Cited

U.S. PATENT DOCUMENTS 6,235,458 B1   5/2001  Hashimoto

| | | | |
|---|---|---|---|
| 2007/0275183 A1* | 11/2007 | Hashimoto | 428/1.2 |
| 2009/0036667 A1* | 2/2009 | Hashimoto et al. | 536/69 |
| 2009/0115100 A1* | 5/2009 | Nakai et al. | 264/291 |
| 2009/0187000 A1* | 7/2009 | Nakai et al. | 527/300 |
| 2009/0195877 A1* | 8/2009 | Nakai | 359/500 |
| 2009/0227782 A1* | 9/2009 | Fujita et al. | 536/63 |

FOREIGN PATENT DOCUMENTS

| | | | |
|---|---|---|---|
| EP | 0 895 123 A1 | | 2/1999 |
| JP | 58160122 | * | 9/1983 |
| JP | 06-501040 | | 2/1994 |
| JP | 11-047676 | | 2/1999 |
| JP | 11-090946 | | 4/1999 |
| JP | 11-248939 | | 9/1999 |
| JP | 2001-042130 | | 2/2001 |
| JP | 2001-114914 A | | 4/2001 |
| JP | 2002-046172 A | | 2/2002 |
| JP | 2002-207124 A | | 7/2002 |
| JP | 2003-167122 A | | 6/2003 |
| JP | 2003-231141 A | | 8/2003 |
| JP | 2004074572 | * | 3/2004 |
| JP | 2005-139304 A | | 6/2005 |

OTHER PUBLICATIONS

CN First Office Action, dated Aug. 7, 2009, issued in corresponding CN Application No. 200680035317.2, 15 pages English and Chinese.

* cited by examiner

*Primary Examiner*—Terressa M Boykin
(74) *Attorney, Agent, or Firm*—Sughrue Mion, PLLC

(57) ABSTRACT

A method for treating an unstretched thermoplastic resin film. The method includes includes heat treating an unstretched thermoplastic resin film at a glass transition temperature of the thermoplastic resin Tg° C. or higher and Tg+50° C. or lower for 10 seconds or longer and 600 seconds or shorter while conveying the thermoplastic resin film at a tension of 2 N/cm² or higher and 50 N/cm² or lower. The method provides a thermoplastic resin film has an in-plane retardation (Re) and a retardation in the thickness direction (Rth) close to 0 nm, and as such the thermoplastic resin film after heat treatment has |Re| of 0 to 10 nm and |Rth| of 0 to 20 nm.

13 Claims, 6 Drawing Sheets

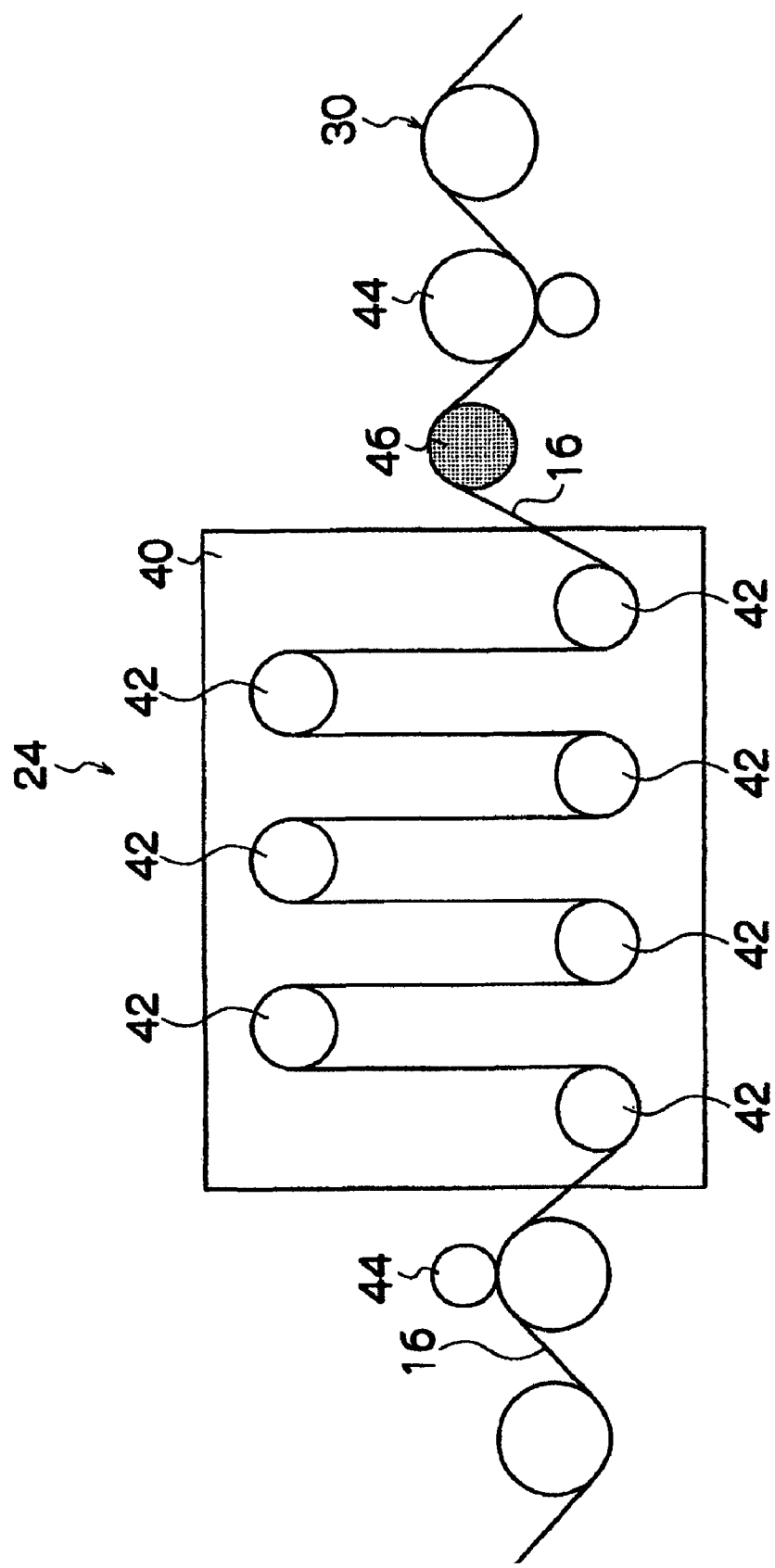

FIG.5A

| | RESIN USED | CELLULOSE ACYLATE, DEGREE OF SUBSTITUTION | | | | | | | SATURATED NORBORNENE | | FILM FORMING PROCESS | Tg(°C) | STRETCHING CONDITIONS | |
|---|---|---|---|---|---|---|---|---|---|---|---|---|---|---|
| | | ACETATE GROUP (X) | PROPIONATE GROUP (Y1) | BUTYRYL GROUP (Y2) | PENTANOYL GROUP (Y3) | HEXANOYL GROUP (Y4) | Y (THE SUM OF Y1 TO Y4) | X+Y | FINE PARTICLE SIZE [μm] | AMOUNT ADDED [ppm] | | | PERCENT OF STRETCH IN LONGITUDINAL STRETCHING [%] | PERCENT OF STRETCH IN TRANSVERSE STRETCHING [%] |
| EXAMPLE 1 | CELLULOSE ACYLATE | 1.30 | 1.50 | | | | 1.50 | 2.80 | - | - | MELT | 132 | 0 | 0 |
| EXAMPLE 2 | CELLULOSE ACYLATE | 1.30 | 1.50 | | | | 1.50 | 2.80 | - | - | MELT | 132 | 0 | 0 |
| EXAMPLE 3 | CELLULOSE ACYLATE | 1.30 | 1.50 | | | | 1.50 | 2.80 | - | - | MELT | 132 | 0 | 0 |
| EXAMPLE 4 | CELLULOSE ACYLATE | 1.30 | 1.50 | | | | 1.50 | 2.80 | - | - | MELT | 132 | 0 | 0 |
| EXAMPLE 5 | CELLULOSE ACYLATE | 1.30 | 1.50 | | | | 1.50 | 2.80 | - | - | MELT | 132 | 0 | 0 |
| EXAMPLE 6 | CELLULOSE ACYLATE | 1.30 | 1.50 | | | | 1.50 | 2.80 | - | - | MELT | 132 | 0 | 0 |
| EXAMPLE 7 | CELLULOSE ACYLATE | 1.30 | 1.50 | | | | 1.50 | 2.80 | - | - | MELT | 132 | 0 | 0 |
| EXAMPLE 8 | CELLULOSE ACYLATE | 1.30 | 1.50 | | | | 1.50 | 2.80 | - | - | MELT | 132 | 0 | 0 |
| EXAMPLE 9 | CELLULOSE ACYLATE | 0.10 | 2.85 | | | | 2.85 | 2.95 | - | - | MELT | 105 | 0 | 0 |
| EXAMPLE 10 | CELLULOSE ACYLATE | 0.70 | 0.50 | 0.50 | 0.50 | 0.50 | 2.00 | 2.70 | - | - | MELT | 102 | 0 | 0 |
| EXAMPLE 11 | CELLULOSE ACYLATE | 0.70 | 0.50 | 0.50 | 0.50 | 0.50 | 2.00 | 2.70 | - | - | SOLUTION | 102 | 0 | 0 |
| EXAMPLE 12 | CELLULOSE ACYLATE | 1.60 | 1.00 | | | | 1.00 | 2.60 | - | - | SOLUTION | 150 | 0 | 0 |
| EXAMPLE 13 | CELLULOSE ACYLATE | 2.90 | | | | | 0.00 | 2.90 | - | - | SOLUTION | 125 | 0 | 0 |
| EXAMPLE 14 | SATURATED NORBORNENE | | | | | | | | 0.1 | 30 | MELT | 135 | 0 | 0 |
| EXAMPLE 15 | SATURATED NORBORNENE | | | | | | | | 2.9 | 9500 | MELT | 135 | 0 | 0 |
| EXAMPLE 16 | SATURATED NORBORNENE | | | | | | | | | 0 | MELT | 135 | 0 | 0 |
| EXAMPLE 17 | SATURATED NORBORNENE | | | | | | | | 4 | 12000 | MELT | 135 | 0 | 0 |
| EXAMPLE 18 | POLYCARBONATE | | | | | | | | - | - | MELT | 150 | 0 | 0 |
| COMPARATIVE EXAMPLE 1 | CELLULOSE ACYLATE | 1.30 | 1.50 | | | | 1.50 | 2.80 | - | - | MELT | 132 | 0 | 0 |
| COMPARATIVE EXAMPLE 2 | CELLULOSE ACYLATE | 1.30 | 1.50 | | | | 1.50 | 2.80 | - | - | MELT | 132 | 0 | 0 |
| COMPARATIVE EXAMPLE 3 | CELLULOSE ACYLATE | 1.30 | 1.50 | | | | 1.50 | 2.80 | - | - | MELT | 132 | 0 | 0 |
| COMPARATIVE EXAMPLE 4 | SATURATED NORBORNENE | | | | | | | | | 0 | MELT | 135 | 0 | 0 |
| COMPARATIVE EXAMPLE 5 | POLYCARBONATE | | | | | | | | - | - | MELT | 150 | 0 | 0 |

FIG.5B

| | | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Example 17 | Example 18 | Comparative Example 1 | Comparative Example 2 | Comparative Example 3 | Comparative Example 4 | Comparative Example 5 |
|---|---|---|---|---|---|---|---|---|---|---|---|---|---|---|---|---|---|---|---|---|---|---|---|---|
| HEAT TREATMENT CONDITIONS | HEAT TREATMENT TEMPERATURE (°C) | 157 | 157 | 142 | 142 | 172 | 172 | 157 | 157 | 130 | 127 | 127 | 175 | 150 | 160 | 160 | 160 | 160 | 170 | 157 | 127 | 157 | 160 | 175 |
| | CONVEYING TENSION DURING HEAT TREATMENT [N/cm²] | 10.8 | 10.8 | 10.8 | 10.8 | 10.8 | 4 | 40 | 10.8 | 10.8 | 10.8 | 10.8 | 10.8 | 10.8 | 10.8 | 10.8 | 10.8 | 10.8 | 10.8 | 10.8 | 10.8 | .60 | 10.8 | 10.8 |
| | HEAT TREATMENT TIME [s] | 50 | 50 | 500 | 500 | 15 | 100 | 50 | 50 | 50 | 50 | 50 | 50 | 50 | 50 | 50 | 50 | 50 | 50 | 8 | 500 | 50 | 8 | 8 |
| EVALUATION OF FILM | Re BEFORE HEAT TREATMENT (nm) | 40 | 40 | 40 | 40 | 40 | 40 | 40 | 40 | −36 | 35 | 6 | 8 | −9 | 40 | 35 | 30 | 30 | 67 | 40 | 40 | 40 | 30 | 67 |
| | |Re| BEFORE HEAT TREATMENT (nm) | 40 | 40 | 40 | 40 | 40 | 40 | 40 | 40 | 36 | 35 | 6 | 8 | 9 | 40 | 35 | 30 | 30 | 67 | 40 | 40 | 40 | 30 | 67 |
| | Re AFTER HEAT TREATMENT (nm) | 3 | 1 | 6 | 3 | 2 | 1 | 2 | 8 | −4 | 4 | 4 | 6 | −3 | 3 | 2 | 3 | 2 | 6 | 25 | 30 | 35 | 25 | 55 |
| | |Re| AFTER HEAT TREATMENT (nm) | 3 | 1 | 6 | 3 | 2 | 1 | 2 | 8 | 4 | 4 | 4 | 6 | 3 | 3 | 2 | 3 | 2 | 6 | 25 | 30 | 35 | 25 | 55 |
| | δRe(w) (%) | 2 | 2 | 2 | 1 | 1 | 1 | 0 | 4 | 2 | 3 | 3 | 2 | 3 | 3 | 3 | 2 | 11 | 3 | 12 | 3 | 5 | 11 | 10 |
| | δRe(d) (%) | 2 | 3 | 2 | 1 | 1 | 1 | 2 | 5 | 2 | 3 | 4 | 4 | 3 | 1 | 3 | 3 | 9 | 4 | 13 | 2 | 6 | 12 | 11 |
| | Rth BEFORE HEAT TREATMENT (nm) | 50 | 50 | 50 | 50 | 50 | 50 | 50 | 50 | −45 | 44 | 46 | 46 | −38 | 50 | 45 | 40 | 78 | 50 | 50 | 50 | 50 | 40 | 75 |
| | |Rth| BEFORE HEAT TREATMENT (nm) | 50 | 50 | 50 | 50 | 50 | 50 | 50 | 50 | 45 | 44 | 46 | 46 | 38 | 50 | 45 | 40 | 78 | 50 | 50 | 50 | 50 | 40 | 75 |
| | Rth AFTER HEAT TREATMENT (nm) | 6 | 2 | 10 | 6 | 2 | 1 | 4 | 14 | −7 | 5 | 6 | 11 | −11 | 5 | 5 | 3 | 5 | 9 | 35 | 40 | 45 | 25 | 60 |
| | |Rth| AFTER HEAT TREATMENT (nm) | 6 | 2 | 10 | 6 | 2 | 1 | 4 | 14 | 7 | 5 | 6 | 11 | 11 | 5 | 5 | 3 | 5 | 9 | 35 | 40 | 45 | 25 | 60 |
| | δRth(w) (%) | 1 | 1 | 1 | 1 | 1 | 1 | 4 | 3 | 2 | 2 | 2 | 3 | 3 | 3 | 3 | 12 | 3 | 13 | 4 | 6 | 15 | 11 | |
| | δRth(d) (%) | 2 | 1 | 2 | 2 | 1 | 1 | 2 | 2 | 3 | 2 | 4 | 2 | 3 | 5 | 3 | 1 | 4 | 11 | 4 | 14 | 4 | 6 | 15 | 9 |
| | FINE RETARDATION NON-UNIFORMITY (%) | 1 | 2 | 2 | 2 | 1 | 1 | 1 | 4 | 3 | 1 | 3 | 3 | 3 | 2 | 2 | 13 | 2 | 2 | 15 | 11 | 9 | 7 | 10 |
| | JUDGEMENT | VERY GOOD | VERY GOOD | VERY GOOD | VERY GOOD | VERY GOOD | VERY GOOD | VERY GOOD | GOOD | VERY GOOD | VERY GOOD | VERY GOOD | VERY GOOD | GOOD | GOOD | VERY GOOD | VERY GOOD | GOOD | VERY GOOD | POOR | POOR | POOR | POOR | POOR | great # THERMOPLASTIC RESIN FILM AND METHOD FOR PRODUCING THE SAME

TECHNICAL FIELD

The present invention relates to a thermoplastic resin film and a method for producing the same, in particular, to a thermoplastic resin film of quality suitable for liquid crystal displays and a method for producing the same

BACKGROUND ART

Processes for forming thermoplastic resin films can be classified into two large categories solution film forming process and melt film forming process The solution film forming process is a process in which a dope of thermoplastic resin in a solvent is cast from a die upon substrate(s), for example, cooling drum(s) into a film, while the melt film forming process is a process in which a thermoplastic resin is molten in an extruder and the molten resin is extruded from a die upon substrate(s), for example, cooling drum(s) into a film Traditionally, the thermoplastic resin films formed by these processes are stretched in the longitudinal direction (lengthwise direction) and in the transverse direction (widthwise direction) so that they develop in-plane retardation (Re) and retardation in the thickness direction (Rth), and such stretched films have been used as a retardation film for liquid crystal display devices to achieve a wider viewing angle in such displays (e.g. National Publication of Internal Patent Application No 6-501040 and Japanese Patent Application Laid-Open No 2001-42130)

In recent years, however, retardations (Re, Rth) of retardation films requested by manufacturers of liquid crystal display devices have varied from manufacturer to manufacturer, and besides, there have been increasing demands for films with retardations close to 0 nm This is probably because use of a film with retardations close to 0 nm, in other words, use of a film showing a small optical anisotropy makes it easier for manufacturers of liquid crystal display devices to work out an optical design in film processing

DISCLOSURE OF THE INVENTION

However, both the solution film forming process and the melt film forming process pose a problem of causing the films formed in their film forming step, before the film stretching step in which the films undergo stretching treatment, to develop retardation The present invention has been made in the light of the above described circumstances Accordingly, the object of the present invention is to provide a thermoplastic resin film which has reduced retardations, in particular, to provide a thermoplastic resin film which has retardations in the film forming step close to 0 nm, thereby showing a small optical anisotropy and a method for producing the same According to a first aspect of the present invention to attain the aforementioned object, there is provided a method for producing a thermoplastic resin film comprising a step of heat treating a thermoplastic resin film at a glass transition temperature of the thermoplastic resin Tg° C. or higher and (Tg+50)° C. or lower for 10 seconds or longer and 600 seconds or shorter while conveying the thermoplastic resin film at a low tension of 2 N/cm² or higher and 50 N/cm² or lower, whereby the thermoplastic resin film has an in-plane retardation (Re) and a retardation in the thickness direction (Rth) close to 0 nm, respectively As a result of extensive studies to solve the above described problem, the present inventors have found that the retardations of a thermoplastic resin film can be made close to 0 nm by heat treating the thermoplastic resin film at a specified temperature for a specified period of time while conveying the thermoplastic resin film under low tension in a heat treating furnace According to the first aspect, a thermoplastic resin film is heat treated at the glass transition temperature of the thermoplastic resin Tg° C. or higher and (Tg+50)° C. or lower for 10 seconds or longer and 600 seconds or shorter while conveying the thermoplastic resin film at a low tension of 2 N/cm² or higher and 50 N/cm² or lower, whereby retardations in the film forming step can be made closed to 0 nm Furthermore, if the present invention is applied to the formed thermoplastic resin film having undergone stretching treatment in the longitudinal and transverse stretching steps, too large retardations having been developed by the stretching treatment can also be reduced The tension applied to the thermoplastic resin film for conveying the same needs to be sufficiently high not to allow the film to sag during its conveyance, and at the same time, sufficiently low not to allow the film to develop retardation by tension caused by conveyance, and the tension in the range of 2 N/cm² to 50 N/cm² is not a problem Preferably the tension is in the range of 2 N/cm² to 30 N/cm², more preferably in the range of 4 N/cm² to 30 N/cm², and much more preferably in the range of 4 N/cm² to 20 N/cm² The heat treatment temperature is preferably in the range of the glass transition temperature of the thermoplastic resin used Tg° C. to (Tg+50)° C., because if the temperature is lower than Tg° C., the Re and Rths cannot be made close to 0 nm, while if the temperature is higher than (Tg+50)° C., the thermoplastic resin film sticks to the roll More preferably the heat treatment temperature is in the range of Tg° C. to (Tg+40)° C., much more preferably in the range of Tg° C. to (Tg+30)° C., and most preferably in the range of (Tg+10)° C. to (Tg+30)° C. The heat treatment time is preferably in the range of 10 seconds to 600 seconds, because if the time is too short, the effect of making the Re and Rths close to 0 nm is not produced, while even if the time is too long, better effect cannot be expected More preferably the heat treatment time is in the range of 20 seconds to 450 seconds, much more preferably in the range of 30 seconds to 300 seconds, and most preferably in the range of 40 seconds to 200 seconds The present invention is applicable to thermoplastic resin films formed by either of the solution film forming process and the melt film forming process The expression "make the Re and Rths close to 0 nm" herein used includes making the Re and Rths 0 nm According to a second aspect of the present invention, there is provided the method for producing a thermoplastic resin film according to the first aspect wherein the heat treatment is performed for an unstretched thermoplastic resin film not having undergone stretching treatment in a stretching step The present invention has the effect of making the Re, Rths of not only unstretched thermoplastic resin films but also stretched thermoplastic resin films close to 0 nm However, such effect is more noticeable when applied to unstretched thermoplastic resin films According to a third aspect of the present invention, there is provided the method for producing a thermoplastic resin film according to the second aspect, wherein the thermoplastic resin film after the heat treatment has |Re| of 0 to 10 nm and |Rth| of 0 to 20 nm The thermoplastic resin film produced by the production method of the present invention is allowed to have |Re| in the range of 0 to 10 nm and |Rth| in the range of 0 to 20 nm Here, |Re| and |Rth| represent the absolute values of Re and Rth, respectively According to a fourth aspect of the present invention, there is provided the method for producing a thermoplastic resin film according to any one of the first to third aspects, wherein the thermoplastic resin film after the heat treatment has a change in in-plane retardation (Re) by wet heat (δRe(w)), a change in Re by dry heat (δRe(d)), a change in retardation in the thickness direction by wet heat (δRth(w)) and a change in Rth by dry heat (δRth(d)) of 0% or more and 10% or less, respectively The thermoplastic resin film produced by the production method of the present invention is allowed to have a change in in-plane retardation (Re) by wet heat (δRe(w)), a change in Re by dry heat (δRe(d)), a change in retardation in the thickness direction (Rth) by wet heat (δRth(w)) and a change in Rth by dry heat (δRth(d)) of 0% to 10%, respectively The terms "change in retardation by wet heat" and change in retardation by dry heat" herein used mean that the changes in retardation of a thermoplastic resin film occurring when the thermoplastic resin film is allowed to stand in an atmosphere at 60° C. and 90% rh for 500 hours and when the thermoplastic resin film is allowed to stand in a dry atmospheres (relative humidity 10% or less) at 80° C. for 500 hours, respectively According to a fifth aspect of the present invention, there is provided the method for producing a thermoplastic resin film according to any one the first to fourth aspects, wherein the thermoplastic resin film after the heat treatment has a fine retardation non-uniformity of 0% or more and 10% or less The thermoplastic resin film produced by the production method of the present invention is allowed to have a fine retardation non-uniformity of 0% to 10% The term "fine retardation non-uniformity" herein used means the change in retardation caused in a very small area within 1 mm According to a sixth aspect of the present invention, there is provided the method for producing a thermoplastic resin film according to any one of the first to fifth aspects, wherein the thermoplastic resin is a cellulose acylate resin The present invention is particularly effective when the thermoplastic resin is a cellulose acylate resin According to a seventh aspect of the present invention, there is provided the method for producing a thermoplastic resin film according to the sixth aspect, wherein the cellulose acylate resin has a substitution degree of acylate group satisfying the following formulas 20≦X+Y≦30, 0≦x≦20, 12≦y≦29, when X represents a substitution degree of acetyl group, and Y represents a total substitution degree of propionyl group, butyryl group, pentanoyl group and hexanoyl group The cellulose acylate resin that satisfies the above described formulas is characterized by low melting point, ease of stretching and excellent moisture barrier properties, and thus, a thermoplastic resin film excellent as a functional film such as a retardation film for liquid crystal display devices can be obtained According to an eighth aspect of the present invention, there is provided the method for producing a thermoplastic resin film according to any one of the first to fifth aspects, wherein the thermoplastic resin is a saturated norbornene resin The present invention is particularly effective when the thermoplastic resin is a saturated norbornene resin According to a ninth aspect of the present invention, there is provided the method for producing a thermoplastic resin film according to the eighth aspect, wherein the thermoplastic resin film contains fine particles having an average particle size of 01 μm or larger and 30 μm or smaller at a concentration of 1 ppm or more and 10000 ppm or less The present invention is particularly effective in preventing the occurrence of fine retardation non-uniformity in the manufacturing of a thermoplastic resin film According to a tenth aspect of the present invention, there is provided the method for producing a thermoplastic resin film according to any one of the first to fifth aspects, wherein the thermoplastic resin is a polycarbonate resin The present invention is particularly effective when the thermoplastic resin is a polycarbonate resin According to an eleventh aspect of the present invention, there is provided a thermoplastic resin film, wherein the film is produced by the production method according to any one of the first to tenth aspects According to a twelfth aspect of the present invention, there is provided a sheet polarizer, comprising at least one stacked layer of the thermoplastic resin film according to the eleventh aspect According to a thirteenth aspect of the present invention, there is provided an optical compensation film for liquid crystal display panels, comprising, as a substrate, the thermoplastic resin according to the eleventh aspect According to a fourteenth aspect of the present invention, there is provided an antireflection film, comprising, as a substrate, the thermoplastic resin film according to the eleventh aspect According to the present invention, the retardations developed in the film forming step are made close to 0 nm, whereby a thermoplastic resin film with retardations close to 0 can be produced Accordingly, the thermoplastic resin film produced according to the present invention makes it possible to provide a film with retardations close to 0 nm, that is, a film showing a small optical anisotropy, which is requested by manufacturers of liquid crystal display devices

BRIEF DESCRIPTION OF THE DRAWINGS

FIG. 4 is a block diagram showing one embodiment of the retardation reducing apparatus to which the present invention is applied, and FIGS. 5A and 5B are illustrations of examples of the present invention

DESCRIPTION OF SYMBOLS

10 Film forming section, 11 Extruder, 12 Die, 13 Jacket, 14 Cooling drum, 15 Retardation measuring device, 16 Cellulose acylate film, 17 Temperature controlling device, 18 Retardation suppression mechanism, 19 Temperature sensor, 22 Pass roll, 24 Retardation reducing section, 26 Cylinder, 28 Screw shaft, 30 Winding-up section, 31 Flight, 32 Single shaft screw, 34 Feed opening, 36 Discharge opening, 40 Furnace, 42 Pass roller, 44 Nip roll, 46 Tension measuring roll, A Feeding section of extruder, B Compressing section of extruder, C Measuring section of extruder

BEST MODE FOR CARRYING OUT THE INVENTION

Figure 1:
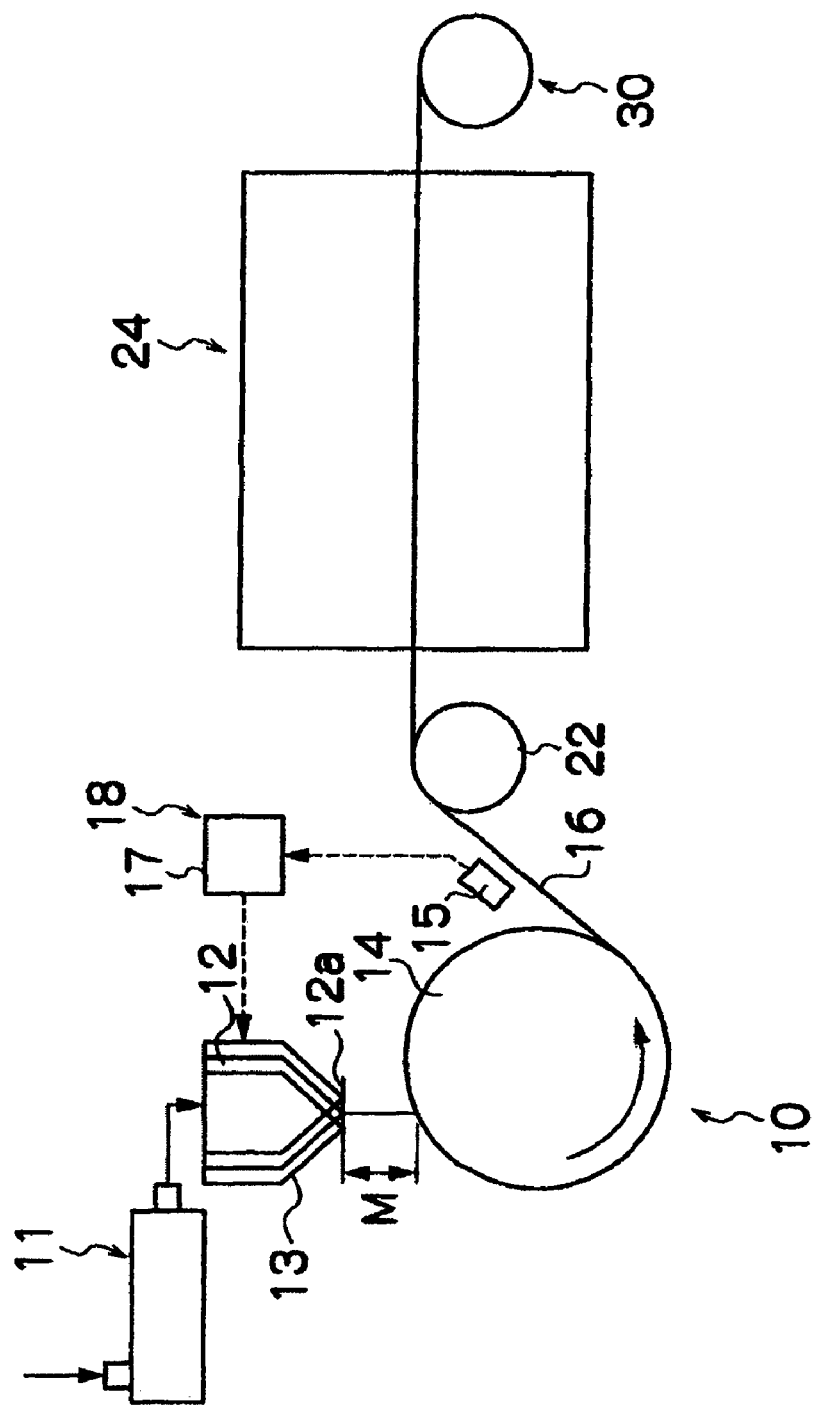
FIG. 1 is a block diagram showing one embodiment of the film forming section having a retardation suppression mechanism in the film manufacturing apparatus of the present invention.

In the following a preferred embodiment of the method for producing a thermoplastic resin film of the present invention will be described with reference to the accompanying drawings While this embodiment will be described in terms of manufacturing a cellulose acylate film the present invention is not limited to this, but is applicable to manufacturing other thermoplastic resin films such as a saturated norbornene resin film and a polycarbonate resin film A preferred embodiment of the cellulose acylate film of the present invention and a preferred embodiment of the method for producing the same will be described with reference to the accompanying drawings FIG. 1 is a schematic diagram showing one example of apparatus for manufacturing a cellulose acylate film, which will be described in terms of manufacturing a cellulose acylate film using melt film forming process As shown in FIG. 1, the manufacturing apparatus comprises mainly of a film forming section 10 where a cellulose acylate film 16 is formed, a retardation reducing section 24 where the cellulose acylate film 16 having been formed in the film forming section 10 is heat treated, and a winding-up section 30 where the cellulose acylate film 16 is wound up In the film forming section 10, the cellulose acylate resin having been molten in an extruder 11 (hereinafter referred to as molten resin) is discharged in the form of a sheet from a die 12 and cast upon a rotating cooling drum 14 (cooling support) to be rapidly cooled and solidified Thus, a cellulose acylate film 16 is formed The cellulose acylate film 16 is then stripped from the cooling drum 14 and fed, via a pass roll 22, to the retardation reducing section 24 where its retardation is reduced, and wound up into a roll in the wind-up section 30

Figure 2:
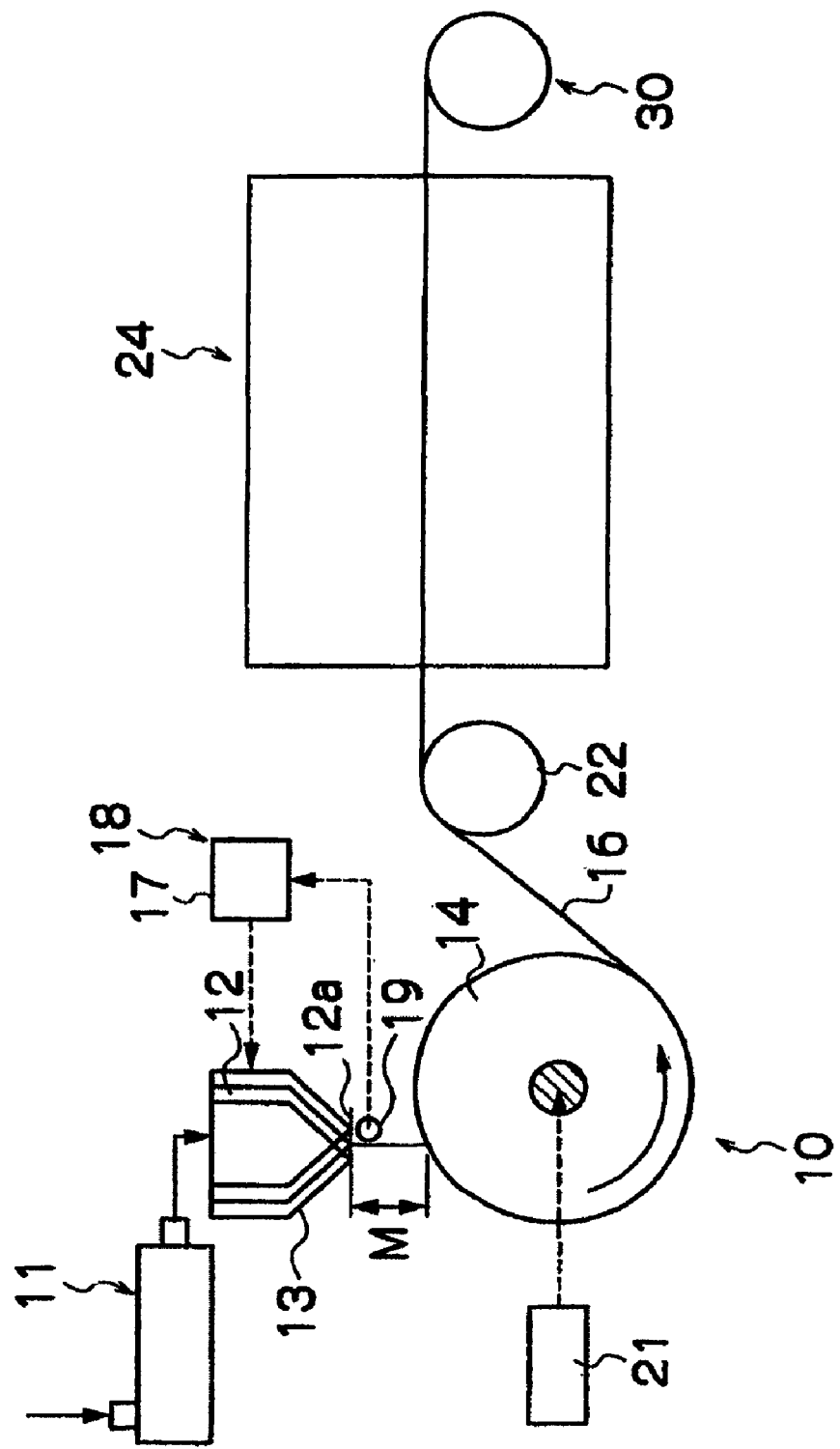
FIG. 2 is a block diagram showing another embodiment of the film forming section having a retardation suppression mechanism in the film manufacturing apparatus of the present invention.

On the periphery of the die 12 is provided a jacket 13 (heater) for adjusting the temperature of the molten resin in the die 12 (at least the outlet portion of the die) and in the neighborhood of the film-stripping position of the cooling drum 14 is provided retardation measuring device 15 for making online measurements of the retardation of the cellulose acylate film 16 stripped off from the cooling drum 14 The measurements obtained through the retardation measuring device 15 are output one after another into temperature controlling device 17 As the retardation online measuring device 15, for example, KOBRA-WID manufactured by Oji Scientific Instruments can be used The temperature controlling device 17 controls the temperature of the molten resin at the outlet 12a of the die by controlling the temperature of the jacket 13 so that the retardations measured by the retardation measuring device 15 are allowed to be low This makes up a retardation suppression mechanism 18 which suppresses the retardation developed in the cellulose acylate film 16 due to the stretching action occurring in the film forming section 10 to desired low values The jacket 13 may be of an electrical or hot-water type The jacket 13 usually works to thermally warm the die 12, but preferably it also has the function of cooling the die 12, because if the temperature of the molten resin is too high, the cellulose acylate film 16 formed is colored FIG. 2 shows another embodiment of retardation suppression mechanism 18 On the periphery of a die 12 is provided a jacket 13 for adjusting the temperature of the molten resin in the die 12 (at least the outlet portion of the die) and in the neighborhood of the outlet of the die 12 is provided a temperature sensor 19 for measuring the temperature of the molten resin discharged from the die 12 in a non-contact manner The measurements obtained by the temperature sensor 19 are output one after another into temperature controlling device 17 Speed controlling device 21 for controlling the rotational speed of a cooling drum 14 is also provided The temperature controlling device 17 controls the temperature of the jacket 13 so that the temperature of the molten resin measured by the temperature sensor 19 falls in the range of the glass transition temperature of the molten resin (Tg)+70° C. to (Tg)+150° C., while the speed controlling device 21 controls the rotational speed of the cooling drum 14 so that the lip clearance ratio (D/W) falls in the range of 1.5 to 10 It is desirable to obtain the relationship between the lip clearance ratio and the rotational speed by, for example, conducting tests and input the obtained test results into the speed controlling device 21 in advance The term 'lip clearance ratio (D/W)" herein used means the ratio of the lip clearance (D) of the die 12 to the thickness (W) of the molten resin extruded from the die 12, and the lip clearance ratio increases with the increase in the rotational speed of the cooling drum 14 This makes it possible to suppress the retardation of the cellulose acylate film developed due to the stretching action occurring in the film forming section 10 to desired low values In this case, too, it is preferable that the jacket 13 has not only the function of warming the die 12, but the function of cooling the die 12

Figure 3:
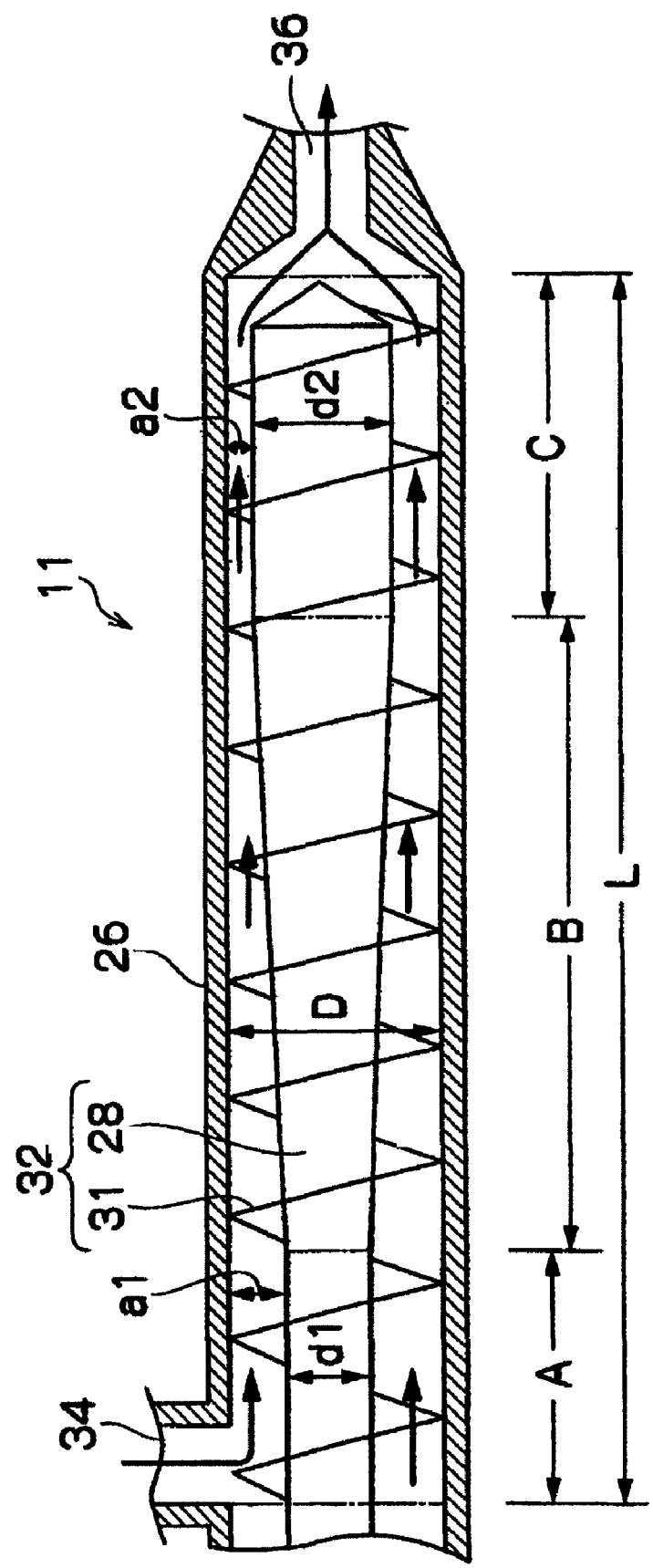
FIG. 3 is a schematic view showing the construction of an extruder.

As shown in FIGS. 1 and 2, the distance (M) between the outlet of the die 12 and the position on the cooling drum 14 at which the molten resin extruded from the outlet of the die lands is preferably in the range of 5 to 200 mm Allowing the distance (M) to fall in such a range enables the retardation distribution of the cellulose acylate film to be suppressed The term "retardation distribution' herein used means the difference between the maximum and the minimum retardations FIG. 3 is a cross-sectional view showing the single-screw extruder 11

As shown in FIG. 3, in a cylinder 26, a single shaft screw 32 is provided which consists of a screw shaft 28 and a flight 30 provided on the screw shaft And a cellulose acylate resin is fed into the cylinder 26 from a hopper, not shown in the figure, via a feed opening 34 The inside of the cylinder 26 is made up of a feeding section where a fixed amount of the cellulose acylate resin fed through the feed opening 34 is transported (the area shown by character A), a compressing section where the cellulose acylate resin is kneaded and compressed (the area shown by character B), and a measuring section where the kneaded and compressed cellulose acylate resin is measured (the area shown by character C) in this order from the feed opening 34 The cellulose acylate resin molten in the extruder 11 is continuously fed to the die through a discharge opening 36

The screw compression ratio of the extruder 11 is set to 25 to 45 and L/D to 20 to 70 The term "screw compression ratio" herein used means the volume ratio of the feeding section A to the measuring section C, in other words, the volume per unit length of the feeding section A—the volume per unit length of the measuring section C, and it is calculated using the outside diameter d1 of the screw shaft 28 of the feeding section A, the outside diameter d2 of the screw shaft 28 of the measuring section C, the diameter a1 of the flight channel of the feeding section A and the diameter a2 of the flight channel of the measuring section C The term "L/D" herein used means the ratio of the length (L) to the inside diameter (D) of the cylinder shown in FIG. 2 The extrusion temperature (the outlet temperature of the extruder) is set to 190 to 240° C. When the temperature inside the extruder 11 is higher than 240° C., a refrigerator (not shown in the figure) should be provided between the extruder 11 and the die 12

Accordingly, to make the formed cellulose acylate film less likely to yellow and less likely to break in stretching, the screw compression ratio of the extruder 11 is preferably in the range of 25 to 45, the L/D of the extruder 11 is preferably in the range of 20 to 70 and the extrusion temperature is preferably in the range of 190° C. to 240° C. in the present invention The extruder 11 may be either a single-screw extruder or a twin-screw extruder However, if the screw compression ratio is as low as less than 25, the thermoplastic resin is not fully kneaded, thereby causing an unmolten part, or the magnitude of heat evolution by shear stress is too small to sufficiently fuse crystals, thereby making fine crystals more likely to remain in the formed cellulose acylate film Furthermore, the cellulose acylate film is made more likely to include air bubbles Conversely, if the screw compression ratio is as high as more than 45, the magnitude of heat evolution by shear stress is so large that the resin becomes more likely to deteriorate by heat, which makes the formed cellulose acylate film more likely to yellow Further, too large shear stress causes molecule breakage, which results in decrease in molecular weight, and hence in mechanical strength of the film Accordingly, to make the formed cellulose acylate film less likely to yellow and less likely to break in stretching, the screw compression ratio is preferably in the range of 25 to 45, more preferably in the range of 28 to 42, and particularly preferably in the range of 30 to 40

The L/D as low as less than 20 causes insufficient melting or insufficient kneading, which makes fine crystals more likely to remain in the formed cellulose acylate film, like the case where the compression ratio is too low Conversely, the L/D as high as more than 70 makes too long the residence time of the cellulose acylate resin in the extruder 11, which makes the resin more likely to deteriorate Too long a residence time may cause molecule breakage, which results in decrease in molecular weight, and hence in mechanical strength of the film Accordingly, to make the formed cellulose acylate film less likely to yellow and less likely to break in stretching, the L/D is preferably in the range of 20 to 70, more preferably in the range of 22 to 45, and particularly preferably in the range of 24 to 40

If the extrusion temperature is as low as lower than 190° C., crystals are not sufficiently melted, which makes fine crystals more likely to remain in the formed cellulose acylate film Conversely, if the extrusion temperature is as high as higher than 240° C., the cellulose acylate resin deteriorates, which causes the degree of yellow (YI value) to increase Accordingly, to make the formed cellulose acylate film less likely to yellow and less likely to break in stretching, the extrusion temperature is preferably in the range of 190° C. to 240° C., more preferably in the range of 195° C. to 235° C., and particularly preferably in the range of 200° C. to 230° C.

Preferably the unstretched cellulose acylate film of the present invention has a haze of 20% or lower The haze can be used as an index for knowing whether the extrusion temperature is too low or not, in other words, an index for knowing whether the amount of the crystals remaining in the formed cellulose acylate film is large or not And when the haze is higher than 20%, the amount of the fine crystals remaining in the formed cellulose acylate film is large, and therefore, the film is likely to be ruptured by stretching In the film forming section 10 of the manufacturing apparatus made up as above, the molten resin molten in the extruder 11 is continuously fed into the die 12, extruded in the form of a sheet through the outlet of the die 12 upon the rotating cooling drum 14, and cooled and solidified on the cooling drum Thus, a cellulose acylate film 16 is formed Instead of the cooling drum 14a cooling band can also be used, though it is not shown in the figure The cooling band is wound around and stretched between a driving roller and a follower roller so that it runs on an elliptical orbit when the driving roller is driven In the manufacturing of a cellulose acylate film 16 as described above, the molten resin discharged from the die 12 and landed on the cooling drum 14 is given a sudden jerk by the rotation of the cooling drum 14, whereby the molten resin discharged in the form of a sheet receives stretching action across the length This stretching action causes the formed cellulose acylate film 16 to develop retardation, which in turn obstructs the manufacture of a film with retardations close to 0 nm, which is requested by manufacturers of liquid crystal display devices In the embodiment of the present invention, the retardation suppression mechanism 18 suppresses the development of retardation in the film forming section However, even in this case, retardation can sometimes be developed when film forming, and thus, without the retardation suppression mechanism 18, the degree of retardation is necessarily increased Now, the retardation reducing section 24 in the production method of the present invention will be described FIG. 4 is a block diagram showing one example of construction of the retardation reducing apparatus 24 used in the present invention In FIGS. 1 and 2, in the retardation reducing section 24, the retardation reducing step is carried out for the cellulose acylate film 16 formed in the film forming section 10, after the film forming section 10 and before the winding-up section 30 However, the retardation reducing step may be carried out in an apparatus consisting of the retardation reducing section 24 alone for the cellulose acylate film 16 which has been formed in the film forming section, once wound up in the winding-up section 30, and fed to the apparatus It goes without saying that the cellulose acylate film 16 used may not be necessarily formed with the apparatus according to the present invention, but may be commercially available one In the retardation reducing apparatus 24, pass rollers 42, 42, for conveying the cellulose acylate film 16 are provided inside the furnace 40 which is for adjusting the temperature To convey the cellulose acylate film 16 while keeping the same under low tension, preferably nip rolls 44 are used to feed the cellulose acylate film 16 to the furnace 40 and draw the same from the furnace 40 If nip rolls are used in such a manner, the cellulose acylate film 16 can be conveyed while kept under low tension just by changing the roller rotational speed of the nip rolls 44 after measuring the tension with a tension measuring roll 46 In this case, to do tension cut-off, a suction drum may be used instead of the nip rolls 44

The cellulose acylate film 16 undergoes heat treatment at a temperature of Tg° C. or higher and Tg+50° C. or lower for 10 seconds or longer and 600 seconds or shorter while being conveyed under a tension of 2 N/cm$^2$ or higher and 50 N/cm$^2$ or lower The reason for the tension being 2 N/cm$^2$ or higher is that if the tension is lower than 2 N/cm$^2$, the cellulose acylate film 16 sags The reason for the tension being 50 N/cm$^2$ or lower is that if the tension is higher than 50 N/cm$^2$, the cellulose acylate film 16 is stretched, thereby making it impossible to make the retardations close to 0 nm The reason for the heat treatment temperature being Tg° C. or higher is that if the temperature is lower than Tg° C., the effect of the heat treatment is not produced The reason for the heat treatment temperature being Tg+50° C. or lower is that if the temperature is higher than Tg+50° C., the cellulose acylate film 16 sticks to the rolls The reason for the heat treatment time being 10 seconds or longer is that if the time is shorter than 10 seconds, the effect of heat treatment is not produced due to the too short heat treatment time The reason for the heat treatment time being 600 seconds or shorter is that since the effect of making the retardations of the cellulose acylate film 16 close to 0 nm is attained before 600 seconds has elapsed, if the time is longer than 600 seconds, better effect cannot be expected There is no problem of tension, as long as it is in the range of 2 to 50 N/cm², preferably it is in the range of 2 to 30 N/cm², more preferably in the range of 4 to 30 N/cm² and much more preferably in the range of 4 to 20 N/cm² The heat treatment temperature is preferably in the range of Tg° C. to Tg+50° C., more preferably in the range of Tg° C. to Tg+40° C., much more preferably in the range of Tg° C. to Tg+30° C. and most preferably in the range of Tg+10° C. to Tg+30° C.

Heat treating the cellulose acylate film 16 as described above allows the values of the in-plane retardation Re and the retardation in the thickness direction Rth to be made close to 0 nm Furthermore, the present invention allows |Re| of the cellulose acylate film 16 after the heat treatment to be in the range of 0 to 10 nm and |Rth| of the same to be in the range of 0 to 20 nm The cellulose acylate film 16 after the heat treatment is wound up into a roll in the winding-up section 30 While the present invention has been described in terms of the embodiment where the formed film not having undergone stretching is treated in the retardation reducing section 24, the present invention may also be applied to the formed film having undergone longitudinal or transverse stretching to adjust the retardation developed by too much stretching In the cellulose acylate film 16 obtained after the heat treatment, any of the changes in in-plane retardation (Re) by wet heat ($\delta$Re(w)) and by dry heat ($\delta$Re(d)) and the changes in retardation in the thickness direction (Rth) by wet heat ($\delta$Rth(w)) and by dry heat ($\delta$Rth(d)) allows to fall in the range of 0% or more and 10% or less The "$\delta$Re(d), $\delta$Rth(d)" herein used mean the changes in Re, Rth of a thermoplastic resin film occurring when the film is allowed to stand in a dry atmosphere at 80° C. for 500 hours, which are expressed by the following equations The term "dry" herein used means the relative humidity of 10% or lower $$\delta Re(d)(\%)=100\times|Re(F)-Re(T)|/Re(F)$$

$$\delta Rth(d)(\%)=100\times|Rth(F)-Rth(T)|/Rth(F)$$

wherein Re(F), Rth(F) represent the Re, Rth of a thermoplastic resin film before it is allowed to stand in a dry atmosphere at 80° C. for 500 hours, while Re(T), Rth(T) represent the Re, Rth of a thermoplastic resin film after it is allowed to stand in a dry atmosphere at 80° C. for 500 hours The "$\delta$Re(w) $\delta$Rth(w)" herein used mean the changes in Re, Rth of a thermoplastic resin film occurring when the film is allowed to stand in an atmosphere at 60° C., 90% rh for 500 hours, which are expressed by the following equations $$\delta Re(w)(\%)=100\times|Re(F)-Re(t)|/Re(F)$$

$$\delta Rth(w)(\%)=100\times|Rth(F)-Rth(t)|/Rth(F)$$

wherein Re(F), Rth(F) represent the Re, Rth of a thermoplastic resin film before it is allowed to stand in an atmosphere at 60° C., 90% rh for 500 hours, while Re(t), Rth(t) represent the Re, Rth of a thermoplastic resin film after it is allowed to stand in an atmosphere at 60° C., 90% rh for 500 hours The Re(F), Rth(F) are the retardations of a thermoplastic resin film after the film undergoes moisture conditioning in an atmosphere at 25° C., 60% rh for 5 hours or longer, which is measured in the same atmosphere The retardations can be determined with, for example, an automatic birefrigence analyzer (KOBRA-21ADH/PR manufactured by Oji Scientific Instruments)

Preferably the fine retardation non-uniformity is 0% or more and 10% or less, more preferably 0% or more and 8% or less, and much more preferably 0% or more and 5% or less, and it can be reduced by the present invention The fine retardation non-uniformity has been becoming issue with increase in the resolution of liquid crystal displays The term "fine retardation non-uniformity" herein used means the change in retardation occurring in a very small area within 1 mm, and it is measured in the following manner First, the in-plane retardation (Re) values of a film are measured at 01 mm intervals in an area of 1 mm both in the transverse direction (TD) and in the longitudinal direction (MD) Then, the differences between the maximum and the minimum of the measured retardations are obtained for both TD and MD And each of the obtained differences is divided by the average of the measured retardations The quotients are expressed in percentage The larger one of the two quotients for TD and MD expressed in percentage is taken as fine retardation non-uniformity When the thermoplastic resin is a saturated norbornene resin, preferably the saturated norbornene resin film contains fine particles at a concentration of 1 ppm or higher and 10000 ppm or lower Adding fine particles as a lubricant makes it possible to prevent the thermoplastic resin film from sticking to a touch roll etc, thereby preventing the occurrence of fine retardation non-uniformity due to such sticking Examples of fine particles used in the present invention include those of silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate Fine particles made up of crosslinked polymer can also be used These fine particles generally form secondary particles having an average particle size of 01 to 30 µm, which exist as agglomerates of primary particles in a film and form irregularities 01 to 30 µm in size on the film surface The average secondary particle size is preferably 02 µm or more and 15 µm or less, more preferably 04 µm or more and 12 µm or less, and most preferably 06 µm or more and 11 µm or less The primary particle size and the secondary particle size are determined by observing the particles in the film with a scanning electron microscope and using the diameter of the circle circumscribing each particle as a particle size The average particle size is obtained by averaging the 200 determinations resulting from observation at different sites Preferably the amount of the fine particles added to the saturated norbornene resin is 1 ppm or higher and 10000 ppm or lower on the basis of weight, more preferably 5 ppm or higher and 7000 ppm or lower, and much more preferably 10 ppm or higher and 5000 ppm or lower Fine particles containing silicon are preferable because they can decrease the turbidity of the cellulose acylate film Fine particles of silicon dioxide are particularly preferable Preferably the fine particles of silicon dioxide have an average primary particle size of 20 nm or less and an apparent specific gravity of 70 g/liter or more Those having an average primary particle size as small as 5 to 16 nm are more preferable, because they enable the haze of the film produced to be decreased The apparent specific gravity is preferably 90 to 200 g/liter or more and more preferably 100 to 200 g/liter or more The larger the apparent specific gravity, the more preferable, because fine particles of silicon dioxide having a larger apparent specific gravity make it possible to prepare a dispersion of higher concentration, thereby improving the haze and the agglomerates As fine particles of silicon dioxide, those commercially available, such as Aerosil R972, R972V, R974, R812, 200, 200V, 300, R202, OX50 and TT600 (manufactured by Nippon Aerosil Co, LTD), can be used As fine particles of zirconium oxide, those on the market under the trade name of Aerosil R976 and R811 (manufactured by Nippon Aerosil Co, LTD) can be used Of these fine particles, Aerosil 200V and Aerosil 972V are particularly preferable, because they are fine particles of silicon dioxide having an average primary particle size of 20 nm or less and an apparent specific gravity of 70 g/liter or more and they produce a large effect of reducing friction coefficient of the optical film produced while keeping the turbidity of the same low In the following cellulose acylate resins, methods for processing a cellulose acylate film, etc suitably used for the present invention will be described in detail following the procedures (1) Plasticizer To a resin for use in producing a cellulose acylate film according to the present invention, preferably a polyol plasticizer is added Such a plasticizer has effects of not only lowering the modulus of elasticity of the resin, but also decreasing the difference in crystal amount between both sides of the film The content of a polyol plasticizer in the cellulose acylate resin is preferably 2 to 20% by weight The polyol plasticizer content is preferably 2 to 20% by weight, more preferably 3 to 18% by weight, and much more preferably 4 to 15% by weight If the polyol plasticizer content is less than 2% by weight, the above described effects cannot be fully attained, while if the polyol plasticizer content is more than 20% by weight, bleeding (migration of the plasticizer to the film surface) occurs Polyol plasticizers practically used in the present invention include for example, glycerin-based ester compounds such as glycerin ester and diglycerin ester, polyalkylene glycols such as polyethylene glycol and polypropylene glycol, and compounds in which an acyl group is bound to the hydroxyl group of polyalkylene glycol, all of which are highly compatible with cellulose fatty acid ester and produce remarkable thermoplasticization effect Specific examples of glycerin esters include not limited to, glycerin diacetate stearate, glycerin diacetate palmitate, glycerin diacetate mystirate, glycerin diacetate laurate, glycerin diacetate caprate, glycerin diacetate nonanate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate mystirate, glycerin dipropionate palmitate, glycerin dipropionate stearate, glycerin dipropionate oleate, glycerin tributyrate, glycerin tripentanoate, glycerin monopalmitate, glycerin monostearate glycerin distearate glycerin propionate laurate, and glycerin oleate propionate Either any one of these glycerin esters alone or two or more of them in combination may be used Of these examples, preferable are glycerin diacetate caprylate, glycerin diacetate pelargonate, glycerin diacetate caprate, glycerin diacetate laurate, glycerin diacetate myristate, glycerin diacetate palmitate, glycerin diacetate stearate, and glycerin diacetate oleate Specific examples of diglycerin esters include not limited to, mixed acid esters of diglycerin, such as diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramystyrate, diglycerin tetramynstylate, diglycerin tetrapalmitate, diglycerin triacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate mystyrate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate diheptanoate, diglycerin diacetate dicaprylate, diglycerin diacetate dipelargonate, diglycerin diacetate dicaprate, diglycerin diacetate dilaurate diglycerin diacetate dimystyrate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprylate, diglycerin acetate tripelargonate, diglycerin acetate tricaprate, diglycerin acetate trilaurate, diglycerin acetate trimystyrate, diglycerin acetate trimyristylate, diglycerin acetate tripalmitate, diglycerin acetate tristearate, diglycerin acetate trioleate, diglycerin laurate, diglycerin stearate, diglycerin caprylate, diglycerin myristate, and diglycerin oleate Either any one of these diglycerin esters alone or two or more of them in combination may be used Of these examples, diglycerin tetraacetate, diglycerin tetrapropionate, diglycerin tetrabutyrate, diglycerin tetracaprylate and diglycerin tetralaurate are preferably used Specific examples of polyalkylene glycols include not limited to, polyethylene glycols and polypropylene glycols having an average molecular weight of 200 to 1000 Either any one of these examples or two of more of them in combination may be used Specific examples of compounds in which an acyl group is bound to the hydroxyl group of polyalkylene glycol include not limited to, polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristylate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristylate, polyoxypropylene palmitate, polyoxypropylene stearate, polyoxypropylene oleate, and polyoxypropylene linoleate Either any one of these examples or two or more of them in combination may be used To allow these polyols to fully exert the above described effects, it is preferable to perform the melt film forming of cellulose acylate under the following conditions Specifically, in the film formation process where pellets of the mixture of cellulose acylate and polyol are melt in an extruder and extruded through a T-die, it is preferable to set the temperature of the extruder outlet (T2) higher than that of the extruder inlet (T1), and it is more preferable to set the temperature of the die (T3) higher than T2 In other words, it is preferable to increase the temperature with the progress of melting The reason for this is that if the temperature of the above mixture is rapidly increased at the inlet, polyol is first melt and liquefied, and cellulose acylate is brought to such a state that it floats on the liquefied polyol and cannot receive sufficient shear force from the screw, which results in occurrence of un-molten cellulose acylate In such an insufficiently mixed mixture of polyol and cellulose acylate polyol, as a plasticizer, cannot exert the above described effects, as a result, the occurrence of the difference between both sides of the melt film after melt extrusion cannot be effectively suppressed Furthermore, such inadequately molten matter results in a fish-eye-like contaminant after the film formation Such a contaminant is not observed as a brilliant point even through a polarizer, but it is visible on a screen when light is projected into the film from its back side Fish eyes may cause tailing at the outlet of the die, which results in increased number of die lines T1 is preferably in the range of 150 to 200° C., more preferably in the range of 160 to 195° C., and more preferably in the range of 165 to 190° C. T2 is preferably in the range of 190 to 240° C., more preferably in the range of 200 to 230° C., and more preferably in the range of 200 to 225° C. It is most important that such melt temperatures T1, T2 are 240° C. or lower If the temperatures are higher than 240° C., the modulus of elasticity of the formed film tends to be high The reason is probably that cellulose acylate undergoes decomposition because it is melted at high temperatures, which causes crosslinking in it, and hence increase in modulus of elasticity of the formed film The die temperature T3 is preferably 200 to less than 235° C., more preferably in the range of 205 to 230° C., and much more preferably in the range of 205 to 225° C.

(2) Stabilizer

In the present invention, it is preferable to use, as a stabilizer, either phosphite compound or phosphate ester compound, or both phosphite compound and phosphite ester compound This enables not only the suppression of film deterioration with time, but the improvement of die lines These compounds function as a leveling agent and get rid of the die lines formed due to the irregularities of the die The amount of these stabilizers mixed is preferably 0005 to 05% by weight, more preferably 001 to 04% by weight, and much more preferably 002 to 03% by weight of the resin mixture (i) Phosphite Stabilizer Specific examples of preferred phosphate color protective agents include not limited to, phosphate color protective agents expressed by the following chemical formulas (general formulas) (1) to (3)

Chemical Formula (1)

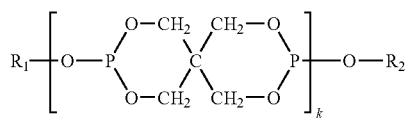

Chemical Formula (2)

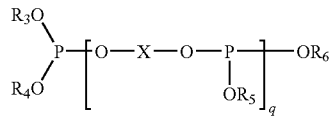

Chemical Formula (3)

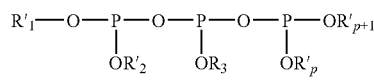

(In the above chemical formulas, R1, R2 R3, R4, R5, R6, R'1, R'2, R'3R n, R'n+1 each represent hydrogen or a group selected from the group consisting of alkyl, aryl, alkoxyalkyl, aryloxyalkyl, alkoxyaryl, arylalkyl, alkylaryl, polyaryloxyalkyl, polyalkoxyalkyl and polyalkoxyaryl which have 4 or more and 23 or less carbon atoms However, in the chemical formulas (1), (2) and (3), at least one substituent is not hydrogen X in the phosphate color protective agents expressed by the chemical formula (2) represents a group selected from the group consisting of aliphatic chain, aliphatic chain with an aromatic nucleus on its side chain, aliphatic chain including an aromatic nucleus in it, and the above described chains including two or more oxygen atoms not adjacent to each other k and q independently represents an integer of 1 or larger, and p an integer of 3 or larger)

The k, q in the phosphate color protective agents are preferably 1 to 10 If the k, q are 1 or larger, the agents are less likely to volatilize when heating If they are 10 or smaller, the agents have an improved compatibility with cellulose acetate propionate Thus the k, q in the above range are preferable p is preferably 3 to 10 If the p is 3 or more, the agents are less likely to volatilize when heating If the p is 10 or less, the agents have improved compatibility with cellulose acetate propionate Specific examples of preferred phosphate color protective agents expressed by the chemical formula (general formula) (1) below include phosphate color protective agents expressed by the chemical formulas (4) to (7) below Chemical Formula (1)

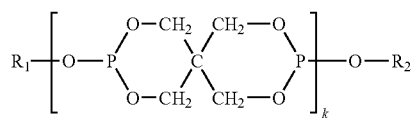

Chemical Formula (4)

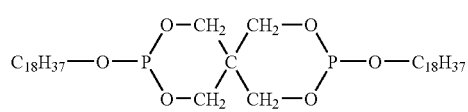

Chemical Formula (5)

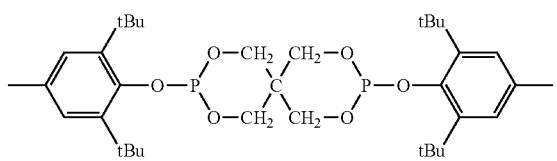

-continued

Chemical Formula (6)

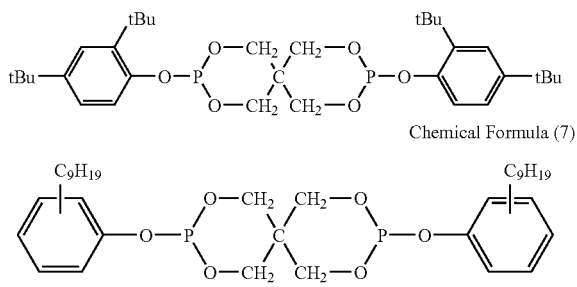

Chemical Formula (7)

Specific examples of preferred phosphite color protective agents expressed by the chemical formula (general formula) (2) below include phosphate color protective agents expressed by the chemical formulas (8), (9) and (10) below Chemical Formula (2)

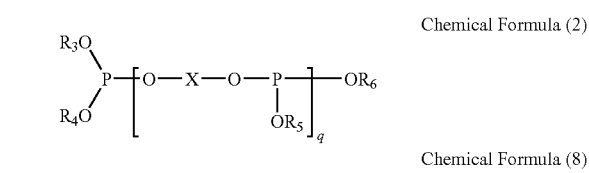

Chemical Formula (8)

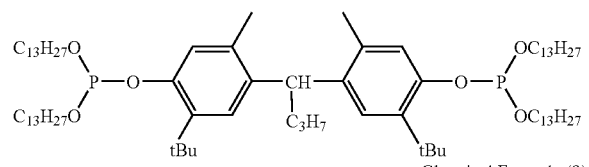

Chemical Formula (9)

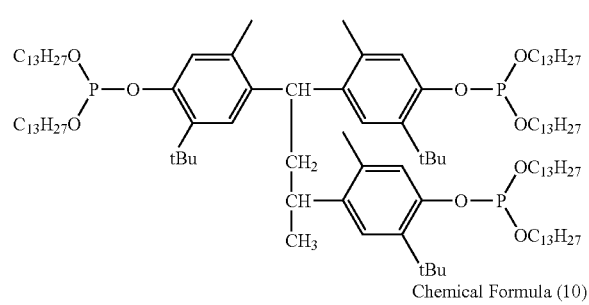

Chemical Formula (10)

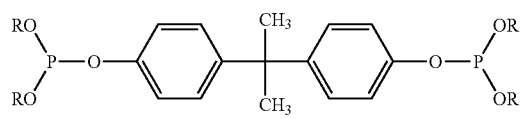

R=alkyl group with 12 to 15 carbon atoms (ii) Phosphite Ester Stabilizer

Examples of phosphite ester stabilizers include cyclic neopentane tetraylbis(octadecyl)phosphite, cyclic neopentane tetraylbis(2,4-di-t-butylphenyl)phosphite, cyclic neopentane tetraylbis(2,6-di-t-butyl-4-methylphenyl)phosphite, 2,2-methylene-bis(4,6-di-t-butylphenyl)octylphosphite, and tris(2,4-di-t-butylphenyl)phosphite (iii) Other Stabilizers A weak organic acid, thioether compound, or epoxy compound, as a stabilizer, may be mixed with the resin mixture Any weak organic acids can be used as a stabilizer in the present invention, as long as they have a pKa of 1 or more, do not interfere with the action of the present invention, and have color preventive and deterioration preventive properties Examples of such weak organic acids include tartaric acid, citric acid, malic acid, fumaric acid, oxalic acid, succinic acid and maleic acid Either any one of these acids alone or two or more of them in combination may be used Examples of thioether compounds include dilauryl thiodipropionate, ditridecyl thiodipropionate, dimyristyl thiodipropionate, distearyl thiodipropionate, and palmityl stearyl thiodipropionate Either any one of these compounds alone or two or more of them in combination may be used Examples of epoxy compounds include compounds derived from epichlorohydrin and bisphenol A Derivatives from epichlorohydrin and glycerin or cyclic compounds such as vinyl cyclohexene dioxide or 3,4-epoxy-6-methylcyclohexylmethyl-3,4-epoxy-6-methylcyclohexane carboxylate can also be used Epoxydized soybean oil, epoxydized castor oil or long-chain α-olefin oxides can also be used Either any one of these compounds alone or two or more of them in combination may be used (3) Cellulose Acylate <<Cellulose Acylate Resin>>

(Composition, Degree of Substitution)

A cellulose acylate that satisfies all of the requirements expressed by the following formulas (1) to (3) is preferably used in the present invention $20 \leq X+Y \leq 30$ formula (1)

$0 \leq X \leq 20$ formula (2)

$12 \leq Y \leq 29$ formula (3)

(In the above formulas (1) to (3), X represents the substitution degree of acetate group and Y represents the sum of the substitution degrees of propionate group butyrate group, pentanoyl group and hexanoyl group)

A cellulose acylate that satisfies all of the requirements expressed by the following formulas (4) to (6) is more preferably used in the present invention $24 \leq X+Y \leq 30$ formula (4)

$005 \leq X \leq 18$ formula (5)

$13 \leq Y \leq 29$ formula (6)

A cellulose acylate that satisfies all of the requirements expressed by the following formulas (7) to (9) is still more preferably used in the present invention $25 \leq X+Y \leq 295$ formula (7)

$01 \leq X \leq 16$ formula (8)

$14 \leq Y \leq 29$ formula (9)

Thus, the cellulose acylate resin used in the present invention is characterized in that it has propionate, butyrate, pentanoyl and hexanoyl groups introduced into it Setting the substitution degrees in the above described range is preferable because it enables the melt temperature to be decreased and the pyrolysis caused by melt film formation to be suppressed Conversely, setting the substitution degrees outside the above described range is not preferable, because it allows the modulus of elasticity of the film to be outside the range of the present invention Either any one of the above cellulose acylates alone or two or more of them in combination may be used A cellulose acylate into which a polymeric ingredient other than cellulose acylate has been properly mixed may also be used In the following a process for producing the cellulose acylate according to the present invention will be described in detail The raw material cotton for the cellulose acylate according to the present invention or process for synthesizing the same are described in detail in Journal of Technical Disclosure (Laid-Open No 2001-1745, issued on Mar. 15, 2001, Japan Institute of Invention and Innovation), pp 7-12

(Raw Materials and Pretreatment)

As a raw material for cellulose, one from broadleaf pulp, conifer pulp or cotton linter is preferably used As a raw material for cellulose, a material of high purity whose α-cellulose content is 92% by mass or higher and 999% by mass or lower is preferably used When the raw material for cellulose is a film-like or bulk material, it is preferable to crush it in advance, and it is preferable to crush the material to such a degree that the cellulose is in the form of fluff (Activation)

Preferably, the cellulose material undergoes treatment, prior to acylation, where it is brought into contact with an activator (activation) As an activator, a carboxylic acid or water can be used When water is used, it is preferable to carry out, after the activation, the steps of adding excess acid anhydride to the material to dehydrate it, washing the material with carboxylic acid to replace water, and control the acylation conditions The activator can be controlled to any temperature before it is added to the material, and a method for its addition can be selected from the group consisting of spraying, dropping and dipping Carboxylic acids preferably used as an activator are those having 2 or more and 7 or less carbon atoms (e.g. acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptanoic acid, cyclohexanecarboxylic acid and benzoic acid), more preferably acetic acid, propionic acid and butyric acid, and particularly preferably acetic acid When carrying out the activation, catalyst for acylation such as sulfuric acid can also be added according to the situation However, addition of a strong acid such as sulfuric acid can sometimes promote depolymerization, thus, preferably the amount of the catalyst added is kept about 01% by mass to 10% by mass of the amount of the cellulose Two or more activators may be used in combination or an acid anhydride of carboxylic acid having 2 or more and 7 or less carbon atoms may also be added The amount of activator(s) added is preferably 5% by mass or more of the amount of the cellulose, more preferably 10% by mass or more, and particularly preferably 30% by mass or more If the amount of activator(s) is larger than the above described minimum value, preferably troubles such that the degree of activating the cellulose is lowered will not occur The maximum amount of activator(s) added is not particularly limited, as long as it does not decrease the productivity, however, preferably the amount is 100 times the amount of the cellulose or less, in terms of mass, more preferably 20 times the amount of the cellulose or less, and particularly preferably 10 times the amount of the cellulose or less Activation may be carried out by adding excess activator(s) to the cellulose and then decreasing the amount of the activator(s) through the operation of filtration, air drying, heat drying, distillation under reduced pressure or solvent replacement The activation duration is preferably 20 minutes or longer The maximum duration is not particularly limited, as long as it does not affect the productivity, however, the duration is preferably 72 hours or shorter, more preferably 24 hours or shorter and particularly preferably 12 hours or shorter The activation temperature is preferably 0° C. or higher and 90° C. or lower, more preferably 15° C. or higher and 80° C. or lower, and particularly preferably 20° C. or higher and 60° C. or lower The process of the cellulose activation can also be carried out under pressure or reduced pressure As a heating device, electromagnetic wave such as micro wave or infrared ray may be used (Acylation)

In the method for producing a cellulose acylate in the present invention, preferably the hydroxyl group of cellulose is acylated by adding an acid anhydride of carboxylic acid to the cellulose to react them in the presence of a Bronsted acid or Lewis acid catalyst As a method for obtaining a cellulose-mixed acylate, any one of the methods can be used in which two kinds of carboxylic anhydrides, as acylating agents, are added in the mixed state or one by one to react with cellulose, in which a mixed acid anhydride of two kinds of carboxylic acids (e.g. acetic acid-propionic acid-mixed acid anhydride) is used, in which a carboxylic acid and an acid anhydride of another carboxylic acid (e g acetic acid and propionic anhydride) are used as raw materials to synthesize a mixed acid anhydride (e.g. acetic acid-propionic acid-mixed acid anhydride) in the reaction system and the mixed acid anhydride is reacted with cellulose, and in which first a cellulose acylate whose substitution degree is lower than 3 is synthesized and the remaining hydroxyl group is acylated using an acid anhydride or an acid halide (Acid Anhydride)

Acid anhydrides of carboxylic acids preferably used are those of carboxylic acids having 2 or more and 7 or less carbon atoms, which include for example, acetic anhydride, propionic anhydride, butyric anhydride, 2-methylpropionic anhydride, valeric anhydride, 3-methylbutyric anhydride, 2-methylbutyric anhydride, 2,2-dimethylpropionic anhydride (pivalic anhydride), hexanoic anhydride, 2-methylvaleric anhydride, 3-methylvaleric anhydride, 4-methylvaleric anhydride, 2,2-dimethylbutyric anhydride, 2,3-dimethylbutyric anhydride, 3,3-dimethylbutyric anhydride, cyclopentanecarboxylic anhydride, heptanoic anhydride, cyclohexanecarboxylic anhydride and benzoic anhydride More preferably used are acetic anhydride, propionic anhydride, butyric anhydride, valeric anhydride, hexanoic anhydride and heptanoic anhydride And particularly preferably used are acetic anhydride, propionic anhydride and butyric anhydride To prepare a mixed ester, it is preferable to use two or more of these acid anhydrides in combination Preferably, the mixing ratio of such acid anhydrides is determined depending on the substitution ratio of the mixed ester Usually, excess equivalent of acid anhydride(s) is added to cellulose Specifically, preferably 12 to 50 equivalents, more preferably 15 to 30 equivalents, and particularly preferably 2 to 10 equivalents of acid anhydride(s) is added to the hydroxyl group of cellulose (Catalyst)

As an acylation catalyst for the production of a cellulose acylate in the present invention, preferably a Bronsted acid or a Lewis acid is used The definitions of Bronsted acid and Lewis acid are described in, for example, "Rikagaku Jiten (Dictionary of Physics and Chemistry)" 5$^{th}$ edition (2000) Examples of preferred Bronsted acids include sulfuric acid, perchloric acid, phosphoric acid and methanesulfonic acid, benzenesulfonic acid and p-toluenesulfonic acid Examples of preferred Lewis acids include zinc chloride, tin chloride, antimony chloride and magnesium chloride As the catalyst, sulfuric acid and perchloric acid are preferable, and sulfuric acid is particularly preferable The amount of the catalyst added is preferably 01 to 30% by mass of the amount of cellulose, more preferably 1 to 15% by mass, and particularly preferably 3 to 12% by mass (Solvent)

When carrying out acylation, a solvent may be added to the reaction mixture so as to adjust the viscosity, reaction speed, ease of stirring or acyl substitution ratio of the reaction mixture As such a solvent, dichloromethane, chloroform, a carboxylic acid, acetone, ethyl methyl ketone, toluene, dimethyl sulfoxide or sulfolane can be used Preferably, a carboxylic acid is used Examples of carboxylic acids include for example, those having 2 or more and 7 or less carbon atoms, such as acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, and cyclopentanecarboxylic acid Preferable are acetic acid, propionic acid and butyric acid Tow or more of these solvents may be used in the form of a mixture (Acylation Conditions)

The acylation may be carried out in such a manner that a mixture of acid anhydride(s), catalyst and, if necessary, solvent(s) is prepared first and then the mixture is mixed with cellulose, or acid anhydride(s), catalyst and, if necessary, solvent(s) are mixed with cellulose one after another Generally, it is preferable that a mixture of acid anhydride(s) and catalyst or a mixture of acid anhydride(s), catalyst and solvent(s) is prepared first and then the mixture, as an acylating agent, is reacted with cellulose To suppress the temperature increase in the reactor due to the heat of reaction generated in the acylation, it is preferable to cool such an acylating agent in advance The cooling temperature is preferably −50° C. to 20° C., more preferably −35° C. to 1° C., and particularly preferably −25° C. to 5° C. An acylating agent may be in the liquid state or in the frozen solid state when added When added in the frozen solid state the acylating agent may take the form of a crystal, flake or block Acylating agent(s) may be added to cellulose at one time or in installments Or cellulose may be added to acylating agent(s) at one time or in installments When adding acylating agent(s) in installments, either a single acylating agent or a plurality of acylating agents each having different compositions may be used Preferred examples are 1) adding a mixture of acid anhydride(s) and solvent(s) first and then adding catalyst, 2) adding a mixture of acid anhydride(s), solvent(s) and part of catalyst first and then adding a mixture of the rest of catalyst and solvent(s), 3) adding a mixture of acid anhydride(s) and solvent(s) first and then adding a mixture of catalyst and solvent(s), and 4) adding solvent(s) first and then adding a mixture of acid anhydride(s) and catalyst or a mixture of acid anhydride(s), catalyst and solvent(s)

In the method for producing a cellulose acylate of the present invention, the maximum temperature the reaction system reaches in the acylation is preferably 50° C. or lower, though the acylation of cellulose is exothermic reaction The reaction temperature 50° C. or lower is preferable because it can prevent depolymerization from progressing, thereby avoiding such a trouble that a cellulose acylate having a polymerization degree suitable for the purpose of the present invention is hard to obtain The maximum temperature the reaction system reaches in the acylation is preferably 45° C. or lower, more preferably 40° C. or lower, and particularly preferably 35° C. or lower The reaction temperature may be controlled with a temperature control unit or by controlling the initial temperature of the acylating agent used The reaction temperature can also be controlled by reducing the pressure in the reactor and utilizing the vaporization heat of the liquid component in the reaction system Since the exothermic heat in the acylation is larger at the beginning of the reaction, the temperature control can be carried out by cooling the reaction system at the beginning and heating the same afterward The end point of the acylation can be determined by use of the light transmittance, solvent viscosity, temperature change in the reaction system, solubility of the reaction product in an organic solvent or observation with a polarizing microscope The minimum temperature in the reaction is preferably −50° C. or higher, more preferably −30° C. or higher, and particularly preferably −20° C. or higher Acylation duration is preferably 05 hours or longer and 24 hours or shorter, more preferably 1 hour or longer and 12 hours or shorter, and particularly preferably 15 hours or longer and 6 hours or shorter If the duration is 05 hours or shorter, the reaction does not sufficiently progress under normal reaction conditions, while if the duration is longer than 24 hours, industrial production of a cellulose acylate is not preferably performed (Reaction Terminator)

In the method for producing a cellulose acylate used in the present invention, it is preferable to add a reaction terminator after the acylation reaction Any reaction terminator may be used, as long as it can decompose acid anhydride(s) Examples of preferred reaction terminators include water, alcohols (e g ethanol, methanol, propanol and isopropyl alcohol), and compositions including the same The reaction terminators may include a neutralizer as described later In the addition of a reaction terminator, it is preferable not to add water or an alcohol directly, but to add a mixture with a carboxylic acid such as acetic acid, propionic acid or butyric acid, particularly preferably acetic acid, and water Doing so prevents the generation of exothermic heat beyond the cooling ability of the reaction unit, thereby avoiding troubles such as decrease in polymerization degree of the cellulose acylate and precipitation of the cellulose acylate in the undesirable form A carboxylic acid and water can be used at an arbitrary ratio, however, preferably the water content of the mixture is 5% by mass to 80% by mass, more preferably 10% by mass to 60% by mass, and particularly preferably 15% by mass to 50% by mass The reaction terminator may be added to the acylation reactor, or the reactants may be added to the container containing the reaction terminator Preferably, the addition of the reaction terminator is performed spending 3 minutes to 3 hours The reason for this is that if the time spent on the addition of the reaction terminator is 3 minutes or longer, it is possible to prevent too large an exothermic heat, thereby avoiding troubles, such as decrease in polymerization degree of the cellulose acylate, insufficient hydrolysis of acid anhydride(s), or decrease in stability of the cellulose acylate And if the time spent on the addition of the reaction terminator is 3 hours or shorter, it is possible to avoid troubles such as decrease in industrial productivity The time spent on the addition of the reaction terminator is preferably 4 minutes or longer and 2 hours or shorter, more preferably 5 minutes or longer and 1 hour or shorter, and much more preferably 10 minutes or longer and 45 minutes or shorter The reactor not necessarily requires cooling when the reaction terminator is added, however, to suppress the progress of depolymerization, it is preferable to retard the temperature increase in the reactor by cooling the same In this respect, cooling the reaction terminator before its addition is also preferable (Neutralizer)

In the acylation reaction termination step or after the acylation reaction termination step, to hydrolyze excess carboxylic anhydride remaining in the reaction system or neutralize part of or the whole carboxylic acid and esterifying catalyst in the same, a neutralizer (e.g. carbonate, acetate, hydroxide or oxide of calcium, magnesium, iron, aluminum or zinc) or its solution may be added Preferred solvents for such a neutralizer include for example, polar solvents such as water, alcohols (e.g. ethanol, methanol, propanol and isopropyl alcohol), carboxylic acids (e.g. acetic acid, propionic acid and butyric acid), ketones (e.g. acetone and ethyl methyl ketone) and dimethyl sulfoxide, and mixed solvents thereof (Partial Hydrolysis)

In the cellulose acylate thus obtained, the sum of the substitution degrees is approximately 3 Then, to obtain a cellulose acylate with desired substitution degree, generally the obtained cellulose acylate is kept at 20 to 90° C. in the presence of a small amount of catalyst (generally acylating catalyst such as remaining sulfuric acid) and water for several minutes to several days so that the ester linkage is partially hydrolyzed and the substitution degree of the acyl group of the cellulose acylate is decreased to a desired degree (so called aging) Since the sulfate ester of cellulose also undergoes hydrolysis during the process of the above partial hydrolysis, the amount of the sulfate ester bound to cellulose can also be decreased by controlling the hydrolysis conditions Preferably, the catalyst remaining in the reaction system is completely neutralized with a neutralizer as described above or the solution thereof at the time when a desired cellulose acylate is obtained so as to terminate the partial hydrolysis It is also preferable to add a neutralizer which forms a salt slightly soluble in the reaction solution (e.g. magnesium carbonate and magnesium acetate) to effectively remove the catalyst (e.g. sulfuric ester) in the solution or bound to the cellulose (Filtration)

To remove the unreacted matter, slightly soluble salts or other contaminants in the cellulose acylate or to reduce the amount thereof, it is preferable to filter the reaction mixture (dope) The filtration may be carried out in any step after the completion of acylation and before the reprecipitation of the same To control the filtration pressure or the handleability of the cellulose acylate, it is preferable to dilute the cellulose acylate with an appropriate solvent prior to filtration (Reprecipitation)

An intended cellulose acylate can be obtained by mixing the cellulose acylate solution thus obtained into a poor solvent, such as water or an aqueous solution of a calboxylic acid (e.g. acetic acid and propionic acid), or mixing such a poor solvent into the cellulose acylate solution, to precipitate the cellulose acylate, washing the precipitated cellulose acylate, and subjecting the washed cellulose acylate to stabilization treatment The reprecipitation may be performed continuously or in a batchwise operation It is preferable to control the form of the reprecipitated cellulose acylate or the molecular weight distribution of the same by adjusting the concentration of the cellulose acylate solution and the composition of the poor solvent used according to the substitution pattern or the substitution degree of the cellulose acylate (Washing)

Preferably, the produced cellulose acylate undergoes washing treatment Any washing solvent can be used, as long as it slightly dissolves the cellulose acylate and can remove impurities, however, generally water or hot water is used The temperature of the washing water is preferably 25° C. to 100° C., more preferably 30° C. to 90° C., and particularly preferably 40° C. to 80° C. Washing may be carried out in so-called batch process where filtration and replacement are repeated or with continuous washing equipment It is preferable to reuse, as a poor solvent, the liquid waste generated during the processes of reprecipitation and washing or to recover and reuse the solvent such as carboxylic acid by use of technique such as distillation The progress of washing may be traced by any techniques, however, preferred techniques of tracing include for example, hydrogen ion concentration, ion chromatography, electrical conductivity, ICP, elemental analysis, and atomic absorption spectrometry The catalyst (e.g. sulfuric acid, perchloric acid, trifluoroacetic acid, p-toluenesulfonic acid, methanesulfonic acid or zinc chloride), neutralizer (e.g. carbonate, acetate, hydroxide or oxide of calcium, magnesium, iron, aluminum or zinc), reaction product of the neutralizer and the catalyst, carboxylic acid (e.g. acetic acid, propionic acid or butyric acid), reaction product of the neutralizer and the carboxylic acid, etc in the cellulose acylate can be removed by this washing treatment This is highly effective in enhancing the stability of the cellulose acylate (Stabilization)

To improve the stability of the cellulose acylate and reduce the odor of the carboxylic acid, it is preferable to treat the cellulose acylate having been washed with hot water with an aqueous solution of weak alkali (e.g. carbonate, hydrogencarbonate, hydroxide or oxide of sodium, potassium calcium, magnesium or aluminum)

The amount of the residual purities can be controlled by the amount of washing solution, the temperature or time of washing, the method of stirring, the shape of washing container, or the composition or concentration of stabilizer In the present invention, the conditions of acylation, partial hydrolysis and washing are set so that the residual sulfate group (on the basis of the sulfur atom content) is 0 to 500 ppm (Drying)

In the present invention, to adjust the water content of the cellulose acylate to a desirable value, it is preferable to dry the cellulose acylate Any drying method can be employed to dry the cellulose acylate, as long as an intended water content can be obtained, however, it is preferable to carry out drying efficiently by either any one of the techniques such as heating, blast, pressure reduction and stirring alone or two or more of them in combination The drying temperature is preferably 0 to 200° C., more preferably 40 to 180° C., and particularly preferably 50 to 160° C. The water content of the cellulose acylate of the present invention is preferably 2% by mass or less, more preferably 1% by mass or less, and particularly preferably 07% by mass or less (Form)

The cellulose acylate of the present invention can take various forms, such as particle, powder, fiber and bulk forms However, as a raw material for films, the cellulose acylate is preferably in the particle form or in the powder form Thus, the cellulose acylate after drying may be crushed or sieved to make the particle size uniform or improve the handleability When the cellulose acylate is in the particle form, preferably 90% by mass or more of the particles used has a particle size of 05 to 5 mm Further, preferably 50% by mass or more of the particles used has a particle size of 1 to 4 mm Preferably, the particles of the cellulose acylate have a shape as close to a sphere as possible And the apparent density of the cellulose acylate particles of the present invention is preferably 05 to 13, more preferably 07 to 12, and particularly preferably 08 to 115 The method for measuring the apparent density is specified in JIS K-7365

The cellulose acylate particles of the present invention preferably have an angle of repose of 10 to 70 degrees, more preferably 15 to 60 degrees, and particularly preferably 20 to 50 degrees (Degree of Polymerization)

The average degree of polymerization of the cellulose acylate preferably used in the present invention is 100 to 300, preferably 120 to 250, and much more preferably 130 to 200 The average degree of polymerization can be determined by intrinsic viscosity method by Uda et al (Kazuo Uda and Hideo Saltoh, Journal of the Society of Fiber Science and Technology, Japan, Vol 18, No 1, 105-120, 1962) or by the molecular weight distribution measurement by gel permeation chromatography (GPC) The determination of average degree of polymerization is described in detail in Japanese Patent Application Laid-Open No 9-95538

In the present invention the weight average degree of polymerization/number average degree of polymerization of the cellulose acylate determined by GPC is preferably 16 to 36, more preferably 17 to 33, and much more preferably 18 to 32

Of the above described kinds of cellulose acylate, either one kind alone or two or more kinds in combination may be used Cellulose acylate properly mixed with a polymer ingredient other than cellulose acylate may also be used The polymer ingredient mixed with cellulose acylate is preferably such that it is highly compatible with cellulose ester and its mixture with cellulose acylate, when formed into a film, has a transmission of 80% or more, preferably 90% or more and much more preferably 92% or more

EXAMPLES OF CELLULOSE ACYLATE SYNTHESIS

Examples of cellulose acylate syntheses will be described in detail below, however, it should be understood that these examples are not intended to limit the present invention

Synthesis Example 1

Synthesis of Cellulose Acetate Propionate 150 g of cellulose (broadleaf pulp) and 75 g of acetic acid were taken into a 5 L separable flask equipped with a reflux unit, as a reactor, and vigorously stirred for 2 hours while heated in an oil bath whose temperature is adjusted to 60° C. The cellulose thus pretreated was swelled and crushed and in the form of fluff The reactor was then placed in an iced water bath at 2° C. for 30 minutes so that the cellulose was cooled Separately, a mixture of 1545 g of propionic anhydride, as an acylating agent, and 105 g of sulfuric acid was prepared, and the mixture was cooled to −30° C. and added, at one time, to the reactor containing the above described pretreated cellulose After 30 minutes had elapsed, the internal temperature of the reactor was controlled, by increasing the temperature outside the reactor gradually so that it reached 25° C. two hours after the addition of the acylating agent The reactor was then cooled in an iced water bath at 5° C., the internal temperature was controlled so that it reached 10° C. 05 hours after the addition of the acylating agent and 23° C. two hours after the same, and the reaction mixture was stirred for 3 hours while keeping the internal temperature at 23° C. The reactor was then cooled in an iced water bath at 5° C. and 120 g of water-containing 25% by mass acetic acid having been cooled to 5° C. was added over 1-hour period The internal temperature of the reactor was increased to 40° C. and stirred for 15 hours Then, a solution obtained by dissolving magnesium acetate tetrahydrate in an amount, on the mole basis two times of the amount of sulfuric acid in 50% by mass water-containing acetic acid was added to the reactor and stirred for 30 minutes Then, 1 L of water-containing 25% by mass acetic acid, 500 mL of water-containing 33% by mass acetic acid, 1 L of water-containing 50% by mass acetic acid and 1 L of water were added in this order to precipitate cellulose acetate propionate The resultant precipitate of cellulose acetate propionate was washed with hot water The washing conditions were varied as shown in the tables of FIGS. 5A and 5B to obtain different kinds of cellulose acetate propionate with different amount of residual sulfate group After washing, each cellulose acetate propionate was put into an aqueous solution of 0005% by mass calcium hydroxide at 20° C., stirred for 05 hours, further washed with water until the pH of the wash liquid reaches 7, and vacuum dried at 70° C.

The 1H-NMR and GPC measurements revealed that the degree of acetylization, degree of propionization and degree of polymerization of the resultant cellulose acetate propionate were 030, 263 and 320, respectively The content of sulfate group was determined in accordance with ASTM D-817-96

Synthesis Example 2

Synthesis of Cellulose Acetate Butyrate 100 g of cellulose (broadleaf pulp) and 135 g of acetic acid were taken into a 5 L separable flask equipped with a reflux unit, as a reactor, and allowed to stand for 1 hour while heated in an oil bath whose temperature is adjusted to 60° C. Then the mixture was stirred vigorously for 1 hour while heated in an oil bath whose temperature is adjusted to 60° C. The cellulose thus pretreated was swelled and crushed and in the form of fluff The reactor was then placed in an iced water bath at 5° C. for 1 hour so that the cellulose was fully cooled Separately, a mixture of 1080 g of butyric anhydride, as an acylating agent, and 100 g of sulfuric acid was prepared, and the mixture was cooled to −20° C. and added, at one time, to the reactor containing the above described pretreated cellulose After 30 minutes had elapsed, the mixture was allowed to react for 5 hours by increasing the temperature outside the reactor to 20° C. The reactor was then cooled in an iced water bath at 5° C., and 2400 g of water-containing 125% by mass acetic acid having been cooled to about 5° C. was added over 1-hour period The internal temperature of the reactor was increased to 30° C. and the mixture was stirred for 1 hour Then, 100 g of 50% by mass aqueous solution of magnesium acetate tetrahydrate was added to the reactor and stirred for 30 minutes Then, 1000 g of acetic acid and 2500 g of water-containing 50% by mass acetic acid were added little by little to precipitate cellulose acetate butyrate The resultant precipitate of cellulose acetate butyrate was washed with hot water The washing conditions were varied as shown in the tables of FIGS. 5A and 5B to obtain different kinds of cellulose acetate butyrate with different amount of residual sulfate group After washing, each cellulose acetate butyrate was put into an aqueous solution of 0005% by mass calcium hydroxide, stirred for 05 hours, further washed with water until the pH of the wash liquid reaches 7, and vacuum dried at 70° C. The degree of acetylization, degree of butyrization and degree of polymerization of the resultant cellulose acetate butyrate were 084, 212 and 268, respectively (4) Other Additives (i) Matting Agent Preferably, fine particles are added as a matting agent Examples of fine particles used in the present invention include those of silicon dioxide, titanium dioxide, aluminum oxide, zirconium oxide calcium carbonate, talc, clay, calcined kaolin, calcined calcium silicate, hydrated calcium silicate, aluminum silicate, magnesium silicate and calcium phosphate Fine particles containing silicon are preferable because they can decrease the turbidity of the cellulose acylate film Fine particles of silicon dioxide are particularly preferable Preferably, the fine particles of silicon dioxide have an average primary particle size of 20 nm or less and an apparent specific gravity of 70 g/liter or more Those having an average primary particle size as small as 5 to 16 nm are more preferable, because they enable the haze of the film produced to be decreased The apparent specific gravity is preferably 90 to 200 g/liter or more and more preferably 100 to 200 g/liter more The larger the apparent specific gravity, the more preferable, because fine particles of silicon dioxide having a larger apparent specific gravity make it possible to prepare a dispersion of higher concentration, thereby improving the haze and the agglomerates These fine particles generally form secondary particles having an average particle size of 01 to 30 µm, which exist as agglomerates of primary particles in a film and form irregularities 01 to 30 µm in size on the film surface The average secondary particle size is preferably 02 µm or more and 15 µm or less, more preferably 04 µm or more and 12 µm or less, and most preferably 06 µm or more and 11 µm or less The primary particle size and the secondary particle size are determined by observing the particles in the film with a scanning electron microscope and using the diameter of the circle circumscribing each particle as a particle size The average particle size is obtained by averaging the 200 determinations resulting from observation at different sites As fine particles of silicon dioxide, those commercially available, such as Aerosil R972, R972V, R974, R812, 200, 200V, 300, R202, OX50 and TT600 (manufactured by Nippon Aerosil Co, LTD), can be used As fine particles of zirconium oxide, those on the market under the trade name of Aerosil R976 and R811 (manufactured by Nippon Aerosil Co, LTD) can be used Of these fine particles Aerosil 200V and Aerosil R972V are particularly preferable, because they are fine particles of silicon dioxide having an average primary particle size of 20 nm or less and an apparent specific gravity of 70 g/liter more and they produce a large effect of reducing friction coefficient of the optical film produced while keeping the turbidity of the same low (ii) Other Additives Various additives other than the above described matting agent, such as ultraviolet light absorbers (e.g. hydroxybenzophenone compounds, benzotriazole compounds, salicylate ester compounds and cyanoacrylate compounds), infrared absorbers, optical adjustors, surfactants and odor-trapping agents (e.g. amine), can be added to the cellulose acylate of the present invention The materials preferably used are described in detail in Journal of Technical Disclosure Laid-Open No 2001-1745 (issued on Mar. 15, 2001, Japan Institute of Invention and Innovation), pp 17-22

As infrared absorbers, for example, those described in Japanese Patent Application Laid-Open No 2001-194522 can be used, while as ultraviolet light absorbers, for example, those described in Japanese Patent Application Laid-Open No 2001-151901 can be used Both the infrared absorber content and the ultraviolet light absorber content of the cellulose acylate are preferably 0001 to 5% by mass Examples of optical adjustors include retardation adjustors And those described in, for example, Japanese Patent Application Laid-Open Nos 2001-166144, 2003-344655, 2003-248117 and 2003-66230 can be used The use of such a retardation adjustor makes it possible to control the in-plane retardation (Re) and the retardation across the thickness (Rth) of the film produced Preferably, the amount of the retardation adjustor added is 0 to 10% by weight, more preferably 0 to 8% by weight, and much more preferably 0 to 6% by weight (5) Physical Properties of Cellulose Acylate Mixture The above described cellulose acylate mixtures (mixtures of cellulose acylate, plasticizer, stabilizer and other additives) preferably satisfy the following physical properties (i) Loss in Weight In the thermoplastic cellulose acetate propionate composition of the present invention, the loss in weight on heating at 220° C. is 5% by weight or less The term "loss in weight on heating" herein used means the loss in weight at 220° C. of a sample when the temperature of the sample is increased from room temperature at a temperature increasing rate of 10° C./min in an atmosphere of nitrogen gas The loss in weight on heating of cellulose acylate can be 5% by weight or less by allowing cellulose acylate film to take the above described mixture form The loss in weight on heating of a cellulose acylate mixture is more preferably 3% by weight or less and much more preferably 1% by weight or less Keeping the loss in weight on heating of a cellulose acylate mixture in the above described range makes it possible to suppress the trouble occurring in the film formation (generation of air bubbles)

(ii) Melt Viscosity

In the thermoplastic cellulose acetate propionate composition of the present invention, preferably the melt viscosity at 220° C., 1 sec$^1$ is 100 to 1000 Pa sec, more preferably 200 to 800 Pa sec, and much more preferably 300 to 700 Pa sec Allowing the thermoplastic cellulose acetate propionate composition to have such a higher melt viscosity prevents the composition from being stretched under tension at the die outlet, thereby preventing the optical anisotropy (retardation) caused by stretch orientation from increasing Such viscosity adjustment can be performed by any techniques For example, the adjustment can be performed by adjusting the polymerization degree of cellulose acylate or the amount of an additive such as a plasticizer (6) Pelletization Preferably, the above described cellulose acylate and additives are mixed and pelletized prior to melt film formation In pelletization, it is preferable to dry the cellulose acylate and additives in advance, however, if a vented extruder is used, the drying step can be omitted When drying is performed, a drying method can be employed in which the cellulose acylate and additives are heated in a heating oven at 90°

C. for 8 hours or more, though drying methods applicable in the present invention are not limited to this Pelletization can be performed in such a manner that after melting the above described cellulose acylate and additives at temperatures of 150° C. or higher and 250° C. or lower on a twin-screw kneading extruder, the molten mixture is extruded in the form of noodles, and the noodle-shaped mixture is solidified in water, followed by cutting Pelletization may also be performed by underwater cutting in which the above described cellulose acylate and additives are melted on an extruder and extruded through a ferrule directly in water, and cutting is performed in water while carrying out extrusion Any known extruder, such as single screw extruder, non-intermeshing counter-rotating twin-screw extruder, intermeshing counter-rotating twin-screw extruder, intermeshing corotating twin-screw extruder, can be used, as long as it enables melt kneading Preferably, the pellet size is such that the cross section is 1 mm$^2$ or larger and 300 mm$^2$ or smaller and the length is 1 mm or longer and 30 mm or shorter and more preferably the cross section is 2 mm$^2$ or larger and 100 mm$^2$ or smaller and the length is 15 mm or longer and 10 mm or shorter In pelletization, the above described additives may be fed through a raw material feeding opening or a vent located midway along the extruder The number of revolutions of the extruder is preferably 10 rpm or more and 1000 rpm or less, more preferably 20 rpm or more and 700 rpm or less and much more preferably 30 rpm or more and 500 rpm or less If the rotational speed is lower than the above described range, the residence time of the cellulose acylate and additives is increased, which undesirably causes heat deterioration of the mixture, and hence decrease in molecular weight and increase in color change to yellow Further, if the rotational speed is higher than the above described range, molecule breakage by shear is more likely to occur, which gives rise to problems of decrease in molecular weight and increase in crosslinked gel The extrusion residence time in pelletization is preferably 10 seconds or longer and 30 minutes or shorter, more preferably 15 seconds or longer and 10 minutes or shorter, and much more preferably 30 seconds or longer and 3 minutes or shorter As long as the resin mixture is sufficiently melt, shorter residence time is preferable, because shorter residence time enables the deterioration of resin or occurrence of yellowish color to be suppressed (7) Melt Film Formation (1) Drying The cellulose acylate mixture palletized by the above described method is preferably used for the melt film formation, and the water content in the pellets is preferably decreased prior to the film formation In the present invention, to adjust the water content in the cellulose acylate to a desirable amount, it is preferable to dry the cellulose acylate Drying is often carried out using an air dehumidification drier, but the method of drying is not limited to any specific one, as long as an intended water content is obtained (preferably drying is carried out efficiently by either any one of methods, such as heating, air blasting, pressure reduction and stirring, or two or more of them in combination, and more preferably a drying hopper having an insulating structure is used) The drying temperature is preferably 0 to 200° C., more preferably 40 to 180° C., and particularly preferably 60 to 150° C. Too low a drying temperature is not preferable, because if the drying temperature is too low, drying takes a longer time, and moreover, water content cannot be decreased to an intended value or lower Too high a drying temperature is not preferable, either, because if the drying temperature is too high, the resin is adhere to cause blocking The amount of drying air used is preferably 20 to 400 m$^3$/hour, more preferably 50 to 300 m$^3$/hour, and particularly preferably 100 to 250 m$^3$/hour Too small an amount of drying air is not preferable, because if the amount of drying air is too small, drying cannot be carried out efficiently On the other hand, using too large an amount of drying air is not economical This is because the drying effect cannot be drastically improved further even by using excess amount of drying air The dew point of the air is preferably 0 to −60° C., more preferably −10 to −50° C., and particularly preferably −20 to −40° C. The drying time is required to be at least 15 minutes or longer, preferably 1 hour or longer and more preferably 2 hours or longer However, the drying time exceeding 50 hours dose not drastically decrease the water content further and it might cause deterioration of the resin by heat Thus, an unnecessarily long drying time is not preferable In the cellulose acylate of the present invention, the water content is preferably 10% by mass or lower, more preferably 01% by mass or lower, and particularly preferably 001% by mass or lower (ii) Melt Extrusion The above described cellulose acylate resin is fed into a cylinder via the feed opening of an extruder (different from the extruder used for the above described pelletization) The inside of the cylinder consists of a feeding section where the cellulose acylate resin fed through the feed opening is transported in a fixed amount (area A), a compressing section where the cellulose acylate resin is melt-kneaded and compressed (area B), and a measuring section where the melt-kneaded and compressed cellulose acylate resin is measured (area C), from the feed opening side in this order The resin is preferably dried by the above described method so as to decrease the water content, however, to prevent the molten resin from being oxidized by the remaining oxygen, more preferably extrusion is performed in a stream of inert gas (nitrogen etc) or using a vented extruder while performing vacuum evacuation The screw compression ratio of the extruder is set to 25 to 45 and the LID to 20 to 70 The term "screw compression ratio" used herein means the volume ratio of the feeding section A to the measuring section C, in other words, the volume per unit length of the feeding section A—the volume per unit length of the measuring section C, which is calculated using the outside diameter d1 of the screw shaft of the feeding section A, the outside diameter d2 of the screw shaft of the measuring section C, the diameter a1 of the channel of the feeding section A, and the diameter a2 of the channel of the measuring section C The "L/D" means the ratio of the cylinder length to the cylinder inside diameter The extrusion temperature is set to 190 to 240° C. When the temperature inside of the extruder exceeds 240° C., a cooling machine should be provided between the extruder and the die If the screw compression ratio is as small as less than 25, melt-kneading is not sufficiently performed, causing an unmolten part, or the magnitude of heat evolution by shear stress is too small to sufficiently fuse crystals, making fine crystals more likely to remain in the formed cellulose acylate film Furthermore, the cellulose acylate film more likely contains air bubbles As a result, the cellulose acylate film having decreased strength is produced, or in stretching of the cellulose acylate film, the remaining crystals inhibit the stretchability of the film whereby the degree of film orientation cannot be sufficiently increased Conversely, if the screw compression ratio is as high as more than 45, the magnitude of heat evolution by shear stress is so large that the resin becomes more likely to deteriorate, which makes the cellulose acylate film more likely to yellow Further, too large shear stress causes molecule breakage, which results in decrease in molecular weight, and hence in mechanical strength of the film Accordingly, to make the formed cellulose acylate film less likely to be yellow and less likely to break in stretching, the screw compression ratio is preferably in the range of 25 to 45, more preferably in the range of 28 to 42, and particularly preferably in the range of 30 to 40

The L/D as low as less than 20 causes insufficient melting or insufficient kneading, which makes fine crystals more likely to remain in the formed cellulose acylate film, like the case where the compression ratio is too low Conversely, the L/D as high as more than 70 makes too long the residence time of the cellulose acylate resin in the extruder, which makes the resin more likely to deteriorate Too long a residence time may cause molecule breakage, which results in decrease in molecular weight, and hence in mechanical strength of the film Accordingly, to make the formed cellulose acylate film less likely to be yellow and less likely to break in stretching, the L/D is preferably in the range of 20 to 70, more preferably in the range of 22 to 65, and particularly preferably in the range of 24 to 50

The extrusion temperature is preferably set in the above described temperature range The cellulose acylate film thus obtained has the following characteristics a haze of 20% or less, and a yellow index (YI value) of 10 or less The haze herein used is an index of whether the extrusion temperature is too low or not, in other words, an index of the amount of the crystals remaining in the formed cellulose acylate film When the haze is more than 20%, the strength of the formed cellulose acylate film is likely to deteriorate and the breakage of the film is likely to occur On the other hand, the yellow index (YI value) is an index of whether the extrusion temperature is too high or not When the yellow index (YI value) is 10 or less, the formed cellulose acylate film is free from the problem of yellowing As extruder, generally single-screw extruder, which requires lower equipment costs, is often used Types of single-screw extruder include for example, fullflight-type, Madock-type and Dulmage-type For the cellulose acylate resin, which is relatively poor in heat stability, fullflight-type screw extruder is preferably used Twin-screw extruder which is provided with a vent midway along its length, and therefore, makes it possible to perform extrusion while removing unnecessary volatile components can also be used by changing the screw segment though it requires high equipment costs Types of twin-screw extruder include broadly, corotating type and counter-rotating type, and either of the types can be used However, preferably used is a corotating type of twin-screw extruder which causes less residence of the resin and has a high self-cleaning performance Twin-screw extruder is suitable for the film formation of cellulose acylate resin because it makes possible extrusion at low temperatures due to its high kneading performance and high resin-feeding performance, though its equipment costs are high In twin-extruder, if a vent opening is properly arranged, pellets or powder of cellulose acylate can be used in the undried state or the selvedges of the film produced in the course of the film formation can also be reused in the undried state The preferable diameter of the screw vanes depending on the intended amount of the cellulose acylate resin extruded per unit time, however, it is preferably 10 mm or larger and 300 mm or smaller, more preferably 20 mm or larger and 250 mm or smaller, and much more preferably 30 mm or larger and 150 mm or smaller (iii) Filtration To filter contaminants in the resin or avoid the damage to the gear pump caused by such contaminants, it is preferable to perform a so-called breaker-plate-type filtration which uses a filter medium provided at the extruder outlet To filter contaminants with much higher precision, it is preferable to provide, after the gear pump, a filter in which a leaf-type disc filter is incorporated Filtration can be performed with a single filtering section, or it can be multi-step filtration with a plurality of filtering sections A filter medium with higher precision is preferably used, however, taking into consideration the pressure resistance of the filter medium or the increase in filtration pressure due to the clogging of the filter medium, the filtration precision is preferably 15 μm to 3 μm and more preferably 10 μm to 3 μm A filter medium with higher precision is particularly preferably used when a leaf-type disc filter is used to perform final filtration of contaminants And in order to ensure suitability of the filter medium used, the filtration precision may be adjusted by the number of filter media loaded, taking into account the pressure resistance and filter life From the viewpoint of being used at high temperature and high pressure, the type of the filter medium used is preferably a steel material Of the steel materials, stainless steel or steel is particularly preferably used From the viewpoint of corrosion, desirably stainless steel is used A filter medium constructed by weaving wires or a sintered filter medium constructed by sintering, for example, metal long fibers or metal powder can be used However, from the viewpoint of filtration precision and filter life, a sintered filter medium is preferably used (iv) Gear Pump To improve the thickness precision, it is important to decrease the fluctuation in the amount of the discharged resin and it is effective to provide a gear pump between the extruder and the die to feed a fixed amount of cellulose acylate resin through the gear pump A gear pump is such that it includes a pair of gears—a drive gear and a driven gear—in mesh, and it drives the drive gear to rotate both the gears in mesh, thereby sucking the molten resin into the cavity through the suction opening formed on the housing and discharging a fixed amount of the resin through the discharge opening formed on the same housing Even if there is a slight change in the resin pressure at the tip of the extruder, the gear pump absorbs the change, whereby the change in the resin pressure in the downstream portion of the film forming apparatus is kept very small, and the fluctuation in the film thickness is improved The use of a gear pump makes it possible to keep the fluctuation of the resin pressure at the die within the range of ±1%

To improve the fixed-amount feeding performance of the gear pump, a method can also be used in which the pressure before the gear pump is controlled to be constant by varying the number of revolution of the screw Or the use of a high-precision gear pump is also effective in which three or more gears are used to eliminate the fluctuation in gear of a gear pump Other advantages of using a gear pump are such that it makes possible the film formation while reducing the pressure at the tip of the screw, which would be expected to reduce the energy consumption, prevent the increase in resin temperature, improve the transportation efficiency, decrease in the residence time of the resin in the extruder, and decrease the L/D of the extruder Furthermore, when a filter is used to remove contaminants, if a gear pump is not used, the amount of the resin fed from the screw can sometimes vary with increase in filtration pressure However, this variation in the amount of resin fed from the screw can be eliminated by using a gear pump On the other hand, disadvantages of using a gear pump are such that it may increase the length of the equipment used, depending on the selection of equipment, which results in a longer residence time of the resin in the equipment, and the shear stress generated at the gear pump portion may cause the breakage of molecule chains Thus, care must be taken when using a gear pump Preferably, the residence time of the resin, from the time the resin enters the extruder through the feed opening to the time it goes out of the die, is 2 minutes or longer and 60 minutes or shorter, more preferably 3 minutes or longer and 40 minutes or shorter, and much more preferably 4 minutes or longer and 30 minutes or shorter If the flow of polymer circulating around the bearing of the gear pump is not smooth, the seal by the polymer at the driving portion and the bearing portion becomes poor, which may cause the problem of producing wide fluctuations in measurements and feeding and extruding pressures Thus, the gear pump (particularly clearances thereof) should be designed to match to the melt viscosity of the cellulose acylate resin In some cases, the portion of the gear pump where the cellulose acylate resin resides can be a cause of the resin s deterioration Thus, preferably the gear pump has a structure which allows the residence time of the cellulose acylate resin to be as short as possible The polymer tubes or adaptors that connect the extruder with a gear pump or a gear pump with the die should be so designed that they allow the residence time of the cellulose acylate resin to be as short as possible Furthermore, to stabilize the extrusion pressure of the cellulose acylate whose melt viscosity is highly temperature-dependent, preferably the fluctuation in temperature is kept as narrow as possible Generally, a band heater, which requires lower equipment costs, is often used for heating polymer tubes, however, it is more preferable to use a cast-in aluminum heater which is less susceptible to temperature fluctuation Further, to allow G', G'', tan δ, η to have the maximum and the minimum in the extruder as described above, it is preferable to melt the cellulose acylate resin by heating the barrel of the extruder with heater divided into 3 or more and 20 or less (v) Die With the extruder constructed as above, the cellulose acylate is melted and continuously fed into a die, if necessary, through a filter or gear pump Any type of commonly used die, such as T-die, fish-tail die or hanger coat die, may be used, as long as it allows the residence time of the molten resin to be short Further, a static mixer can be introduced right before the T-die to increase the temperature uniformity The clearance at the outlet of the T-die can be 10 to 50 times the film thickness, preferably 12 to 3 times the film thickness, and more preferably 13 to 2 times the film thickness If the lip clearance is less than 10 time the film thickness, it is difficult to obtain a sheet whose surface state is good Conversely, if the lip clearance is more than 50 times the film thickness, undesirably the thickness precision of the sheet is decreased A die is very important equipment which determines the thickness precision of the film to be formed, and thus, one that can severely control the film thickness is preferably used Although commonly used dies can control the film thickness at intervals of 40 to 50 mm, dies of a type which can control the film thickness at intervals of 35 mm or less and more preferably at intervals of 25 mm or less are preferable In the cellulose acylate resin, since its melt viscosity is highly temperature-dependent and shear-rate-dependent, it is important to design a die that causes the least possible temperature uniformity and the least possible flow-rate uniformity across the width The use of an automated thickness adjusting die, which measures the thickness of the film downstream, calculates the thickness deviation and feeds the calculated result back to the thickness adjustment, is also effective in decreasing fluctuations in thickness in the long-term continuous production of the cellulose acylate film In producing films, a single-layer film forming apparatus, which requires lower producing costs, is generally used However, depending on the situation, it is also possible to use a multi-layer film forming apparatus to produce a film having 2 types or more of structure, in which an outer layer is formed as a functional layer Generally, preferably a functional layer is laminated thin on the surface of the cellulose acylate film, but the layer-layer ratio is not limited to any specific one (vi) Cast The molten resin extruded in the form of a sheet from the die in the above described manner is cooled and solidified on cooling drums to obtain a film In this cooling and solidifying operation, preferably the adhesion of the extruded sheet of the molten resin to the cooling drums is enhanced by any of the methods, such as electrostatic application method, air-knife method air-chamber method, vacuum-nozzle method or touch-roll method These adhesion enhancing methods may be applied to either the whole surface or part of the surface of the sheet resulting from melt extrusion A method, called as edge pinning, in which cooling drums are adhered to the edges of the film alone is often employed, but the adhesion enhancing method used in the present invention is not limited to this method Preferably, the molten resin sheet is cooled little by little using a plurality of cooling drums Generally, such cooling is often performed using 3 cooling drums, but the number of cooling drums used is not limited to 3 The diameter of the cooling drums is preferably 100 mm or larger and 1000 mm or smaller and more preferably 150 mm or larger and 1000 mm or smaller The spacing between the two adjacent drums of the plurality of drums is preferably 1 mm or larger and 50 mm or smaller and more preferably 1 mm or larger and 30 mm or smaller, in terms of face—face spacing The temperature of cooling drums is preferably 60° C. or higher and 160° C. or lower, more preferably 70° C. or higher and 150° C. or lower, and much more preferably 80° C. or higher and 140° C. or lower The cooled and solidified sheet is then stripped off from the cooling drums, passed through take-off rollers (a pair of nip rollers), and wound up The wind-up speed is preferably 10 m/mm or higher and 100 m/mm or lower, more preferably 15 m/min or higher and 80 m/min or lower, and much more preferably 20 m/min or higher and 70 m/min or lower The width of the film thus formed is preferably 07 m or more and 5 m or less, more preferably 1 m or more and 4 m or less, and much more preferably 13 m or more and 3 m or less The thickness of the unstretched film thus obtained is preferably 30 μm or more and 400 μm or less, more preferably 40 μm or more and 300 μm or less, and much more preferably 50 μm or more and 200 μm or less When so-called touch roll method is used, the surface of the touch roll used may be made of resin, such as rubber or Teflon, or metal A roll, called as flexible roll, can also be used whose surface gets a little depressed by the pressure of a metal roll having a decreased thickness when the flexible roll and the metal roll touch with each other, and their pressure contact area is increased The temperature of the touch roll is preferably 60° C. or higher and 160° C. or lower, more preferably 70° C. or higher and 150° C. or lower, and much more preferably 80° C. or higher and 140° C. or lower (vii) Winding Up Preferably, the sheet thus obtained is wound up with its edges trimmed away The portions having been trimmed off may be reused as a raw material for the same kind of film or a different kind of film, after undergoing grinding or after undergoing granulation, or depolymerization or re-polymerization depending on the situation Any type of trimming cutter, such as a rotary cutter, shearing blade or knife, may be used The material of the cutter may be either carbon steel or stainless steel Generally, a carbide-tipped blade or ceramic blade is preferably used, because use of such a blade makes the life of a cutter longer and suppresses the production of cuttings It is also preferable, from the viewpoint of preventing the occurrence of scratches on the sheet to provide, prior to winding up, a laminating film at least on one side of the sheet Preferably, the wind-up tension is 1 kg/m (in width) or higher and 50 kg/m (in width) or lower, more preferably 2 kg/m (in width) or higher and 40 kg/m (in width) or lower, and much more preferably 3 kg/m (in width) or higher and 20 kg/m (in width) or lower If the wind-up tension is lower than 1 kg/m (in width), it is difficult to wind up the film uniformly Conversely, if the wind-up tension is higher than 50 kg/m (in width), undesirably the film is too tightly wound, whereby the appearance of wound film deteriorates, and the knot portion of the film is stretched due to the creep phenomenon, causing surging in the film, or residual double refraction occurs due to the extension of the film Preferably, the winding up is performed while detecting the wind-up tension with a tension control provided midway along the line and controlling the same to be constant When there is a difference in the film temperature depending on the spot on the film forming line, a slight difference in the film length can sometimes be created due to thermal expansion, and thus, it is necessary to adjust the draw ratio of the nip rolls so that tension higher than a prescribed one should not be applied to the film Preferably, the winding up of the film is performed while tapering the amount of the film to be wound according to the winding diameter so that a proper wind-up tension is kept, though it can be performed while keeping the wind-up tension constant by the control with the tension control Generally, the wind-up tension is decreased little by little with increase in the winding diameter, however, it can sometimes be preferable to increase the wind-up tension with increase in the winding diameter (viii) Physical Properties of Unstretched Cellulose Acylate Film In the unstretched cellulose acylate film thus obtained, when it has a slow axis across the length of the film, preferably Re=−10 to 80 nm and Rth=0 to 80 nm, more preferably Re=−5 to 80 nm and Rth=0 to 70 nm, and more preferably Re=−5 to 70 nm and Rth=0 to 60 nm Re and Rth represent in-plane retardation and across-the-thickness retardation, respectively Re is measured using KOBRA 21ADH (manufactured by Oji Scientific Instruments) while allowing light to enter the unstretched cellulose acylate film normal to its surface Rth is calculated based on three retardation measurements the Re measured as above, and the Res measured while allowing light to enter the film from the direction inclined at angles of +40°, −40°, respectively, to the direction normal to the film using the slow axis in plane as a tilt axis (rotational axis) Preferably, the angle θ between the direction of the film formation (across the length) and the slow axis of the Re of the film is made as close to 0°, +90° or −90° as possible The total light transmittance is preferably 90% to 100%, more preferably 91% to 99%, and much more preferably 92% to 98% Preferably, the haze is 0 to 1%, more preferably 0 to 08% and much more preferably 0 to 06%

Preferably, the thickness non-uniformity both in the longitudinal direction and the transverse direction is 0% or more and 4% or less, more preferably 0% or more and 3% or less, and much more preferably 0% or more and 2% or less Preferably, the modulus in tension is 15 kN/mm$^2$ or more and 35 kN/mm$^2$ or less, more preferably 17 kN/mm$^2$ or more and 28 kN/mm$^2$ or less, and much more preferably 18 kN/mm$^2$ or more and 26 kN/mm$^2$ or less Preferably, the breaking extension is 3% or more and 100% or less more preferably 5% or more and 80% or less, and much more preferably 8% or more and 50% or less Preferably, the Tg (this indicates the Tg of the film, that is, the Tg of the mixture of cellulose acylate and additives) is 95° C. or higher and 145° C. or lower, more preferably 100° C. or higher and 140° C. or lower, and much more preferably 105° C. or higher and 135° C. or lower Preferably, the dimensional change by heat at 80° C. per day is 0% or higher ±1% or less both in the longitudinal direction and the transverse direction, more preferably 0% or higher ±05% or less, and much more preferably 0% or higher ±03% or less Preferably, the water permeability at 40° C., 90% rh is 300 g/m$^2$ day or higher and 1000 g/m$^2$ day or lower, more preferably 400 g/m$^2$ day or higher and 900 g/m$^2$ day or lower, and much more preferably 500 g/m$^2$ day or higher and 800 g/m$^2$ day or lower Preferably, the average water content at 25° C., 80% rh is 1% by weight or higher and 4% by weight or lower, more preferably 12% by weight or higher and 3% by weight or lower and much more preferably 15% by weight or higher and 25% by weight or lower (8) Stretching The film formed by the above described process may be stretched The Re and Rth of the film can be controlled by stretching Preferably, stretching is carried out at temperatures of Tg or higher and Tg+50° C. or lower, more preferably at temperatures of Tg+3° C. or higher and Tg+30° C. or lower, and much more preferably at temperatures of Tg+5° C. or higher and Tg+20° C. or lower Preferably, the stretch magnification is 1% or higher and 300% or lower at least in one direction, more preferably 2% or higher and 250% or lower, and much more preferably 3% or higher and 200% or lower The stretching can be performed equally in both longitudinal and transverse directions, however, preferably it is performed unequally so that the stretch magnification in one direction is larger than that of the other direction Either the stretch magnification in the longitudinal direction (MD) or that in the transverse direction (TD) may be made larger Preferably, the smaller value of the stretch magnification is 1% or more and 30% or less, more preferably 2% or more and 25% or less, and much more preferably 3% or more and 20% or less Preferably, the larger one is 30% or more and 300% or less, more preferably 35% or more and 200% or less, and much more preferably 40% or more and 150% or less The stretching operation can be carried out in one step or in a plurality of steps The term "stretch magnification" used herein means the value obtained using the following equation Stretch magnification (%)=100×{(length after stretching)−(length before stretching)}/(length before stretching)

The stretching may be performed in the longitudinal direction by using 2 or more pairs of nip rolls and controlling the peripheral velocity of the pairs of nip rolls so that the velocity of the pair on the outlet side is faster than that of the other one(s) (longitudinal stretching) or in the transverse direction (in the direction perpendicular to the longitudinal direction) while allowing both ends of the film to be gripped by a chuck (transverse stretching) Further, the stretching may be performed using the simultaneous biaxial stretching method described in Japanese Patent Application Laid-Open Nos 2000-37772, 2001-113591 and 2002-103445

In the longitudinal stretching, the Re-to-Rth ratio can be freely controlled by controlling the value obtained by dividing the distance between two pairs of nip rolls by the width of the film (length-to-width ratio) In other words, the ratio Rth/Re can be increased by decreasing the length-to-width ratio Further, Re and Rth can also be controlled by combining the longitudinal stretching and the transverse stretching In other words, Re can be decreased by decreasing the difference between the percent of longitudinal stretch and the percent of the transverse stretch, while Re can be increased by increasing the difference between the same Preferably, the Re and Rth of the cellulose acylate film thus stretched satisfy the following formulas, $Rth \geq Re$ $500 \geq Re \geq 0$ $500 \geq Rth \geq 30$, more preferably $Rth \geq Re \times 1.1$ $150 \geq Re \geq 10$ $400 \geq Rth \geq 50$, and much more preferably $Rth \geq Re \times 1.2$ $100 \geq Re \geq 20$ $350 \geq Rth \geq 80$ Preferably, the angle θ between the film forming direction (longitudinal direction) and the slow axis of Re of the film is as close to 0°, +90° or −90° as possible Specifically, in the longitudinal stretching, preferably the angle θ is as close to 0° as possible, and it is preferably 0±3°, more preferably 0±2° and much more preferably 0±1° In the transverse stretching, the angle θ is preferably 90±3° or −90±3°, more preferably 90±2° or −90±2°, and much more preferably 90±1° or −90±1°

Preferably, the thickness of the cellulose acylate film after stretching is 30 μm or more and 300 μm or less, more preferably 30 μm or more and 170 μm or less, and much more preferably 40 μm or more and 140 μm or less Preferably, the thickness non-uniformity is 0% or more and 3% or less in both the longitudinal and transverse directions, more preferably 0% or more and 2% or less, and much more preferably 0% or more and 1% or less The physical properties of the stretched cellulose acylate film are preferably in the following range Preferably, the modulus in tension is 15 kN/mm² or more and less than 30 kN/nm 2, more preferably 17 kN/mm² or more and 28 kN/mm² or less, and much more preferably 18 kN/mm² or more and 26 kN/mm² or less Preferably, the breaking extension is 3% or more and 100% or less, more preferably 5% or more and 80% or less, and much more preferably 8% or more and 50% or less Preferably, the Tg (this indicates the Tg of the film, that is, the Tg of the mixture of cellulose acylate and additives) is 95° C. or higher and 145° C. or lower, more preferably 100° C. or higher and 140° C. or lower, and much more preferably 105° C. or higher and 135° C. or lower Preferably, the dimensional change by heat at 80° C. per day is 0% or higher ±1% or less both in the longitudinal direction and the transverse direction, more preferably 0% or higher ±05% or less and much more preferably 0% or higher ±03% or less Preferably, the water permeability at 40° C., 90% is 300 g/m² day or higher and 1000 g/m² day or lower, more preferably 400 g/m² day or higher and 900 g/m² day or lower, and much more preferably 500 g/m² day or higher and 800 g/m² day or lower Preferably, the average water content at 25° C., 80% rh is 1% by weight or higher and 4% by weight or lower, more preferably 12% by weight or higher and 3% by weight or lower, and much more preferably 15% by weight or higher and 25% by weight or lower The thickness is preferably 30 μm or more and 200 μm or less, more preferably 40 μm or more and 180 μm or less, and much more preferably 50 μm or more and 150 μm or less The haze is 0% or more and 20% or less, more preferably 0% or more and 15% or less, and much more preferably 0% or more and 1% or less The total light transmittance is preferably 90% or higher and 100% or lower, more preferably 91% or higher and 99% or lower, and much more preferably 92% or higher and 98% or lower (9) Surface Treatment The adhesion of both unstretched and stretched cellulose acylate films to each functional layer (e.g. undercoat layer and back layer) can be improved by subjecting them to surface treatment Examples of types of surface treatment applicable include treatment using glow discharge, ultraviolet irradiation, corona discharge, flame, or acid or alkali The glow discharge treatment mentioned herein may be treatment using low-temperature plasma generated in a low-pressure gas at $10^3$ to 20 Torr Or plasma treatment at atmospheric pressure is also preferable Plasma excitation gases are gases that undergo plasma excitation under the above described conditions, and examples of such gases include argon, helium, neon, krypton, xenon, nitrogen, carbon dioxide, flons such as tetrafluoromethane, and the mixtures thereof. These are described in detail in Journal of Technical Disclosure (Laid-Open No 2001-1745, issued on Mar. 15, 2001, by Japan Institute of Invention and Innovation), 30-32 In the plasma treatment at atmospheric pressure, which has attracted considerable attention in recent years, for example, irradiation energy of 20 to 500 Kgy is used at 10 to 1000 Kev, and preferably irradiation energy of 20 to 300 Kgy is used at 30 to 500 Kev Of the above described types of treatment, most preferable is alkali saponification, which is extremely effective as surface treatment for cellulose acylate films Specific examples of such treatment applicable include those described in Japanese Patent Application Laid-Open Nos 2003-3266, 2003-229299, 2004-322928 and 2005-76088

Alkali saponification may be carried out by immersing the film in a saponifying solution or by coating the film with a saponifying solution The saponification by immersion can be achieved by allowing the film to pass through a bath, in which an aqueous solution of NaOH or KOH with pH of 10 to 14 has been heated to 20° C. to 80° C., over 01 to 10 minutes, neutralizing the same, water-washing the neutralized film, followed by drying The saponification by coating can be carried out using a coating method such as dip coating, curtain coating, extrusion coating, bar coating or E-coating A solvent for alkali-saponification solution is preferably selected from solvents that allow the saponifying solution to have excellent wetting characteristics when the solution is applied to a transparent substrate, and allow the surface of a transparent substrate to be kept in a good state without causing irregularities on the surface Specifically, alcohol solvents are preferable, and isopropyl alcohol is particularly preferable An aqueous solution of surfactant can also be used as a solvent As an alkali for the alkali-saponification coating solution, an alkali soluble in the above described solvent is preferable, and KOH or NaOH is more preferable The pH of the alkali-saponification coating solution is preferably 10 or more and more preferably 12 or more Preferably, the alkali saponification reaction is carried at room temperature for 1 second or longer and 5 minutes or shorter, more preferably for 5 seconds or longer and 5 minutes or shorter, and particularly preferably for 20 seconds or longer and 3 minutes or shorter It is preferable to wash the saponifying solution-coated surface with water or an acid and wash the surface with water again after the alkali saponification reaction The coating-type saponification and the removal of orientation layer described later can be performed continuously, whereby the number of the producing steps can be decreased The details of these saponifying processes are described in, for example, Japanese Patent Application Laid-Open No 2002-82226 and WO 02/46809

To improve the adhesion of the unstretched or stretched cellulose acylate film to each functional layer, it is preferable to provide an undercoat layer on the cellulose acylate film The undercoat layer may be provided after carrying out the above described surface treatment or without the surface treatment The details of the undercoat layers are described in Journal of Technical Disclosure (Laid-Open No 2001-1745, issued on Mar. 15, 2001, by Japan Institute of Invention and Innovation), 32

These surface-treatment step and under-coat step can be incorporated into the final part of the film forming step, or they can be performed independently, or they can be performed in the functional-layer providing process

(10) Providing Functional Layer

Preferably, the stretched and unstretched cellulose acylate films of the present invention are combined with any one of the functional layers described in detail in Journal of Technical Disclosure (Laid-Open No 2001-1745, issued on Mar. 15, 2001, by Japan Institute of Invention and Innovation), 32-45 Particularly preferable is providing a polarizing layer (polarizer), optical compensation layer (optical compensation film), antireflection layer (antireflection film) or hard coat layer (i) Providing Polarizing Layer (Preparation of Polarizer)

[Materials Used for Polarizing Layer]

At the present time, generally, commercially available polarizing layers are prepared by immersing stretched polymer in a solution of iodine or a dichroic dye in a bath so that the iodine or dichroic dye penetrates into the binder Coating-type of polarizing films, represented by those manufactured by Optiva Inc, are also available as a polarizing film Iodine or a dichroic dye in the polarizing film develops polarizing properties when its molecules are oriented in a binder Examples of dichroic dyes applicable include azo dye, stilbene dye, pyrazolone dye, triphenylmethane dye, quinoline dye, oxazine dye, thiazine dye and anthraquinone dye The dichroic dye used is preferably water-soluble The dichroic dye used preferably has a hydrophilic substitute (e.g. sulfo, amino, or hydroxyl) Example of such dichroic dyes includes compounds described in Journal of Technical Disclosure, Laid-Open No 2001-1745, 58, (issued on Mar. 15, 2001, by Japan Institute of Invention and Innovation)

Any polymer which is crosslinkable in itself or which is crosslinkable in the presence of a crosslinking agent can be used as a binder for polarizing films And more than one combination thereof can also be used as a binder Examples of binders applicable include compounds described in Japanese Patent Application Laid-Open No 8-338913, column [0022], such as methacrylate copolymers, styrene copolymers, polyolefin, polyvinyl alcohol and denatured polyvinyl alcohol, poly(N-methylolacrylamide), polyester, polyimide, vinyl acetate copolymer, carboxymethylcellulose, and polycarbonate Silane coupling agents can also be used as a polymer Preferable are water-soluble polymers (e.g. poly(N-methylolacrylamide), carboxymethylcellulose, gelatin, polyvinyl alcohol and denatured polyvinyl alcohol), more preferable are gelatin, polyvinyl alcohol and denatured polyvinyl alcohol, and most preferable are polyvinyl alcohol and denatured polyvinyl alcohol Use of two kinds of polyvinyl alcohol or denatured polyvinyl alcohol having different polymerization degrees in combination is particularly preferable The saponification degree of polyvinyl alcohol is preferably 70 to 100% and more preferably 80 to 100% The polymerization degree of polyvinyl alcohol is preferably 100 to 5000 Details of denatured polyvinyl alcohol are described in Japanese Patent Application Laid-Open Nos 8-338913, 9-152509 and 9-316127 For polyvinyl alcohol and denatured polyvinyl alcohol, two or more kinds may be used in combination Preferably, the minimum of the binder thickness is 10 μm For the maximum of the binder thickness, from the viewpoint of light leakage of liquid crystal displays, preferably the binder has the smallest possible thickness The thickness of the binder is preferably equal to or smaller than that of currently commercially available polarizer (about 30 μm), more preferably 25 μm or smaller, and much more preferably 20 μm or smaller The binder for polarizing films may be crosslinked Polymer or monomer that has a crosslinkable functional group may be mixed into the binder Or a crosslinkable functional group may be provided to the binder polymer itself Crosslinking reaction is allowed to progress by use of light, heat or pH changes, and a binder having a crosslinked structure can be formed by crosslinking reaction Examples of crosslinking agents applicable are described in U.S. Pat. (Reissued) No. 23297 Boron compounds (e.g. boric acid and borax) may also be used as a crosslinking agent The amount of the crosslinking agent added to the binder is preferably 01 to 20% by mass of the binder This allows polarizing devices to have good orientation characteristics and polarizing films to have good damp heat resistance The amount of the unreacted crosslinking agent after completion of the crosslinking reaction is preferably 10% by mass or less and more preferably 05% by mass or less Restraining the unreacted crosslinking agent to such an amount improves the weatherability of the binder

[Stretching of Polarizing Film]

Preferably, a polarizing film is dyed with iodine or a dichroic dye after undergoing stretching (stretching process) or rubbing (rubbing process)

In the stretching process, preferably the stretching magnification is 25 to 300 and more preferably 30 to 100 Stretching can be dry stretching, which is performed in the air Stretching can also be wet stretching, which is performed while immersing a film in water The stretching magnification in the dry stretching is preferably 25 to 50, while the stretching magnification in the wet stretching is preferably 30 to 100 Stretching may be performed parallel to the MD direction (parallel stretching) or in an oblique (oblique stretching) These stretching operations may be performed at one time or in several installments Stretching can be performed more uniformly even in high-ratio stretching if it is performed in several installments Oblique stretching in which stretching is performed in an oblique while tilting a film at an angle of 10 degrees to 80 degrees is more preferable (I) Parallel Stretching Process Prior to stretching, a PVA film is swelled The degree of swelling is 12 to 20 (ratio of mass before swelling to mass after swelling) After this swelling operation, the PVA film is stretched in a water-based solvent bath or in a dye bath in which a dichroic substance is dissolved at a bath temperature of 15 to 50° C., preferably 17 to 40° C. while continuously conveying the film via a guide roll etc Stretching can be accomplished in such a manner as to grip the PVA film with 2 pairs of nip rolls and control the conveying speed of nip rolls so that the conveying speed of the latter pair of nip rolls is higher than that of the former pair of nip rolls The stretching magnification is based on the length of PVA film after stretching/the length of the same in the initial state ratio (hereinafter the same), and from the viewpoint of the above described advantages, the stretching magnification is preferably 12 to 35 and more preferably 15 to 30 After this stretching operation, the film is dried at 50° C. to 90° C. to obtain a polarizing film (II) Oblique Stretching Process Oblique stretching can be performed by the method described in Japanese Patent Application Laid-Open No 2002-86554 in which a tenter that projects on a tilt is used This stretching is performed in the air, therefore, it is necessary to allow a film to contain water so that the film is easy to stretch Preferably, the water content in the film is 5% or higher and 100% or lower, the stretching temperature is 40° C. or higher and 90° C. or lower, and the humidity during the stretching operation is preferably 50% rh or higher and 100% rh or lower The absorbing axis of the polarizing film thus obtained is preferably 10 degrees to 80 degrees, more preferably 30 degrees to 60 degrees, and much more preferably substantially 45 degrees (40 degrees to 50 degrees)

[Lamination]

The above described stretched and unstretched cellulose acylate films having undergone saponification and the polarizing layer prepared by stretching are laminated to prepare a polarizer They may be laminated in any direction, but preferably they are laminated so that the angle between the direction of the film casting axis and the direction of the polarizer stretching axis is 0 degree, 45 degrees or 90 degrees Any adhesive can be used for the lamination Examples of adhesives applicable include PVA resins (including denatured PVA such as acetoacetyl, sulfonic, carboxyl or oxyalkylen group) and aqueous solutions of boron compounds Of these adhesives, PVA resins are preferable The thickness of the adhesive layer is preferably 001 to 10 μm and particularly preferably 005 to 5 μm, on a dried layer basis Examples of configurations of laminated layers are as follows a A/P/A
b A/P/B
c A/P/T
d B/P/B
e B/P/T where A represents an unstretched film of the present invention, B a stretched film of the present invention T a cellulose triacetate film (Fujitack), and P a polarizing layer In the configurations a, b, A and B may be cellulose acetate having the same composition, or they may be different In the configuration d, two Bs may be cellulose acetate having the same composition, or they may be different, and their stretching rates may be the same or different When sheets of polarizer are used as an integral part of a liquid crystal display, they may be integrated into the display with either side of them facing the liquid crystal surface, however, in the configurations b, e, preferably B is allowed to face the liquid crystal surface In the liquid crystal displays into which sheets of polarizer are integrated, usually a substrate including liquid crystal is arranged between two sheets of polarizer, however, the sheets of polarizer of a to e of the present invention and commonly used polarizer (T/P/T) can be freely combined On the outermost surface of a liquid crystal display, however, preferably a transparent hard coat layer, an anti-glare layer, antireflection layer and the like is provided, and as such a layer, any one of layers described later can be used Preferably, the sheets of polarizer thus obtained have a high light transmittance and a high degree of polarization The light transmittance of the polarizer is preferably in the range of 30 to 50% at a wavelength of 550 nm, more preferably in the range of 35 to 50%, and most preferably in the range of 40 to 50% The degree of polarization is preferably in the range of 90 to 100% at a wavelength of 550 nm, more preferably in the range of 95 to 100%, and most preferably in the range of 99 to 100%

The sheets of polarizer thus obtained can be laminated with a λ/4 plate to create circularly polarized light In this case, they are laminated so that the angle between the slow axis of the λ/4 plate and the absorbing axis of the polarizer is 45 degrees Any λ/4 plate can be used to create circularly polarized light, however, preferably one having such wavelength-dependency that retardation is decreased with decrease in wavelength is used More preferably, a polarizing film having an absorbing axis which tilts 20 degrees to 70 degrees in the longitudinal direction and a λ/4 plate that includes an optically anisotropic layer made up of a liquid crystalline compound are used These sheets of polarizer may include a protective film laminated on one side and a separate film on the other side Both protective film and separate film are used for protecting sheets of polarizer at the time of their shipping, inspection and the like (ii) Providing Optical Compensation Layer (Preparation of Optical Compensation Film)

An optically anisotropic layer is used for compensating the liquid crystalline compound in a liquid crystal cell in black display by a liquid crystal display It is prepared by forming an orientation film on each of the stretched and unstretched cellulose acylate films and providing an optically anisotropic layer on the orientation film

[Orientation Film]

An orientation film is provided on the above described stretched and unstretched cellulose acylate films which have undergone surface treatment This film has the function of specifying the orientation direction of liquid crystalline molecules However, this film is not necessarily indispensable constituent of the present invention This is because a liquid crystalline compound plays the role of the orientation film, as long as the oriented state of the liquid crystalline compound is fixed after it undergoes orientation treatment In other words, the sheets of polarizer of the present invention can also be prepared by transferring only the optically anisotropic layer on the orientation film, where the orientation state is fixed, on the polarizer An orientation film can be provided using a technique such as rubbing of an organic compound (preferably polymer), oblique deposition of an inorganic compound, formation of a micro-groove-including layer, or built-up of an organic compound (e g ω-tricosanic acid, dioctadecyl methyl ammonium chloride, methyl stearate) by Langmur-Blodgett technique (LB membrane) Orientation films in which orientation function is produced by the application of electric field, electromagnetic field or light irradiation are also known Preferably, the orientation film is formed by rubbing of polymer As a general rule, the polymer used for the orientation film has a molecular structure having the function of orienting liquid crystalline molecules In the present invention, preferably the orientation film has not only the function of orienting liquid crystalline molecules, but also the function of combining a side chain having a crosslinkable functional group (e.g. double bond) with the main chain or the function of introducing a crosslinkable functional group having the function of orienting liquid crystalline molecules into a side chain Either polymer which is crosslinkable in itself or polymer which is crosslinkable in the presence of a crosslinking agent can be used for the orientation film And a plurality of the combinations thereof can also be used Examples of such polymer include those described in Japanese Patent Application Laid-Open No 8-338913, column [0022], such as methacrylate copolymers, styrene copolymers, polyolefin, polyvinyl alcohol and denatured polyvinyl alcohol, poly(N-methylolacrylamide), polyester, polyimide, vinyl acetate copolymer, carboxymethylcellulose, and polycarbonate Silane coupling agents can also be used as a polymer Preferable are water-soluble polymers (e.g. poly(N-methylolacrylamide), carboxymethylcellulose, gelatin, polyvinyl alcohol and denatured polyvinyl alcohol), more preferable are gelatin, polyvinyl alcohol and denatured polyvinyl alcohol, and most preferable are polyvinyl alcohol and denatured polyvinyl alcohol Use of two kinds of polyvinyl alcohol or denatured polyvinyl alcohol having different polymerization degrees in combination is particularly preferable The saponification degree of polyvinyl alcohol is preferably 70 to 100% and more preferably 80 to 100% The polymerization degree of polyvinyl alcohol is preferably 100 to 5000

Side chains having the function of orienting liquid crystal molecules generally have a hydrophobic group as a functional group The kind of the functional group is determined depending on the kind of liquid crystalline molecules and the oriented state required For example, a denatured group of denatured polyvinyl alcohol can be introduced by copolymerization denaturation, chain transfer denaturation or block polymerization denaturation Examples of denatured groups include hydrophilic groups (e.g. carboxylic, sulfonic, phosphonic, amino, ammonium, amide and thiol groups), hydrocarbon groups with 10 to 100 carbon atoms, fluorine-substituted hydrocarbon groups, thioether groups, polymerizable groups (e.g. unsaturated polymerizable groups, epoxy group, azirinyl group), and alkoxysilyl groups (e g trialkoxy, dialkoxy, monoalkoxy) Specific examples of these denatured polyvinyl alcohol compounds include those described in Japanese Patent Application Laid-Open No 2000-155216, columns [0022] to [0145], Japanese Patent Application Laid-Open No 2002-62426, columns [0018] to [0022]

Combining a side chain having a crosslinkable functional group with the main chain of the polymer of an orientation film or introducing a crosslinkable functional group into a side chain having the function of orienting liquid crystal molecules makes it possible to copolymerize the polymer of the orientation film and the polyfunctional monomer contained in the optically anisotropic layer As a result, not only the molecules of the polyfunctional monomer, but also the molecules of the polymer of the orientation film and those of the polyfunctional monomer and the polymer of the orientation film are covalently firmly bonded together Thus, introduction of a crosslinkable functional group into the polymer of an orientation film enables remarkable improvement in the strength of optical compensation films The crosslinkable functional group of the polymer of the orientation film preferably has a polymerizable group, like the polyfunctional monomer Specific examples of such crosslinkable functional groups include those described in Japanese Patent Application Laid-Open No 2000-155216, columns [0080] to [0100] The polymer of the orientation film can be crosslinked using a crosslinking agent, besides the above described crosslinkable functional groups Examples of crosslinking agents applicable include aldehyde, N-methylol compounds, dioxane derivatives, compounds that function by the activation of their carboxyl group, activated vinyl compounds, activated halogen compounds, isoxazol, and dialdehyde starch Two or more kinds of crosslinking agents may be used in combination Specific examples of such crosslinking agents include compounds described in Japanese Patent Application Laid-Open No 2002-62426, columns [0023] to [0024] Aldehyde, which is highly reactive, particularly glutaraldehyde is preferably used as a crosslinking agent The amount of the crosslinking agent added is preferably 01 to 20% by mass of the polymer and more preferably 05 to 15% by mass The amount of the unreacted crosslinking agent remaining in the orientation film is preferably 10% by mass or less and more preferably 05% by mass or less Controlling the amount of the crosslinking agent and unreacted crosslinking agent in the above described manner makes it possible to obtain a sufficiently durable orientation film, in which reticulation does not occur even after it is used in a liquid crystal display for a long time or it is left in an atmosphere of high temperature and high humidity for a long time Basically, an orientation film can be formed by coating the above described polymer, as a material for forming an orientation film, on a transparent substrate containing a crosslinking agent, heat drying (crosslinking) the polymer, and rubbing the same The crosslinking reaction may be carried out at any time after the polymer is applied to the transparent substrate, as described above When a water-soluble polymer, such as polyvinyl alcohol, is used as the material for forming an orientation film, the coating solution is preferably a mixed solvent of an organic solvent having an anti-foaming function (e.g. methanol) and water The mixing ratio is preferably such that water methanol=0100 to 991 and more preferably 0100 to 919 The use of such a mixed solvent suppresses the generation of foam, thereby significantly decreasing defects not only in the orientation film, but also on the surface of the optically anisotropic layer As a coating method for coating an orientation film, spin coating, dip coating, curtain coating, extrusion coating, rod coating or roll coating is preferably used Particularly preferably used is rod coating The thickness of the film after drying is preferably 01 to 10 μm The heat drying can be carried out at 20° C. to 110° C. To achieve sufficient crosslinking, preferably the heat drying is carried out at 60° C. to 100° C. and particularly preferably at 80° C. to 100° C. The drying time can be 1 minute to 36 hours, but preferably it is 1 minute to 30 minutes Preferably, the pH of the coating solution is set to a value optimal to the crosslinking agent used When glutaraldehyde is used, the pH is 45 to 55 and particularly preferably 5

The orientation film is provided on the stretched and unstretched cellulose acylate films or on the above described undercoat layer The orientation film can be obtained by crosslinking the polymer layer and providing rubbing treatment on the surface of the polymer layer, as described above The above described rubbing treatment can be carried out using a treatment method widely used in the treatment of liquid crystal orientation in LCD Specifically, orientation can be obtained by rubbing the surface of the orientation film in a fixed direction with paper gauze, felt, rubber or nylon, polyester fiber and the like Generally the treatment is carried out by repeating rubbing a several times using a cloth in which fibers of uniform length and diameter have been uniformly transplanted In the rubbing treatment industrially carried out, rubbing is performed by bringing a rotating rubbing roll into contact with a running film including a polarizing layer The circularity, cylindricity and deviation (eccentricity) of the rubbing roll are preferably 30 μm or less respectively The wrap angle of the film wrapping around the rubbing roll is preferably 01 to 900 However, as described in Japanese Patent Application Laid-Open No 8-160430, if the film is wrapped around the rubbing roll at 3600 or more, stable rubbing treatment is ensured The conveying speed of the film is preferably 1 to 100 m/min Preferably, the rubbing angle is properly selected from the range of 0 to 60° When the orientation film is used in liquid crystal displays, the rubbing angle is preferably 40° to 50° and particularly preferably 45°

The thickness of the orientation film thus obtained is preferably in the range of 01 to 10 μm Then, liquid crystalline molecules of the optically anisotropic layer are oriented on the orientation film After that, if necessary, the polymer of the orientation film and the polyfunctional monomer contained in the optically anisotropic layer are reacted, or the polymer of the orientation film is crosslinked using a crosslinking agent The liquid crystalline molecules used for the optically anisotropic layer include rod-shaped liquid crystalline molecules and discotic liquid crystalline molecules The rod-shaped liquid crystalline molecules and discotic liquid crystalline molecules may be either high-molecular-weight liquid crystalline molecules or low-molecular-weight liquid crystalline molecules, and they include low-molecule liquid crystalline molecules which have undergone crosslinking and do not show liquid crystallinity any more

[Rod-Shaped Liquid Crystalline Molecules]

Examples of rod-shaped liquid crystalline molecules preferably used include azomethines, azoxys, cyanobiphenyls, cyanophenyl esters, benzoate esters, cyclohexane carboxylic acid phenyl esters cyanophenyl cyclohexanes, cyano-substituted phenyl pyrimidines, alkoxy-substituted phenyl pyrimidines, phenyl dioxanes, tolans, and alkenyl cyclohexyl benzonitriles Rod-shaped liquid crystalline molecules also include metal complexes Liquid crystal polymer that includes rod-shaped liquid crystalline molecules in its repeating unit can also be used as rod-shaped liquid crystalline molecules In other words, rod-shaped liquid crystalline molecules may be bonded to (liquid crystal) polymer Rod-shaped liquid crystalline molecules are described in Kikan Kagaku Sosetsu (Survey of Chemistry, Quarterly), Vol 22, Chemistry of Liquid Crystal (1994), edited by The Chemical Society of Japan, Chapters 4, 7 and 11 and in Handbook of Liquid Crystal Devices, edited by 142th Committee of Japan Society for the Promotion of Science, Chapter 3

The index of birefringence of the rod-shaped liquid crystalline molecules is preferably in the range of 0001 to 07 To allow the oriented state to be fixed, preferably the rod-shaped liquid crystalline molecules have a polymerizable group As such a polymerizable group, a radically polymerizable unsaturated group or cationically polymerizable group is preferable Specific examples of such polymerizable groups include polymerizable groups and polymerizable liquid crystal compounds described in Japanese Patent Application Laid-Open No 2002-62427, columns [0064] to [0086]

[Discotic Liquid Crystalline Molecules]

Discotic liquid crystalline molecules include benzene derivatives described in the research report by C Destrade et al, Mol Cryst Vol 71, 111 (1981), truxene derivatives described in the research report by C Destrade et al, Mol Cryst Vol 122, 141 (1985) and Physics lett, A, Vol 78, 82 (1990), cyclohexane derivatives described in the research report by B Kohne et al, Angew Chem Vol 96, 70 (1984), and azacrown or phenylacetylene macrocycles described in the research report by J M Lehn et al J Chem Commun, 1794 (1985) and in the research report by J Zhang et al, L Am Chem Soc Vol 116, 2655 (1994)

Discotic liquid crystalline molecules also include liquid crystalline compounds having a structure in which straight-chain alkyl group, alkoxy group and substituted benzoyloxy group are substituted radially as the side chains of the mother nucleus at the center of the molecules Preferably, the compounds are such that their molecules or groups of molecules have rotational symmetry and they can provide an optically anisotropic layer with a fixed orientation In the ultimate state of the optically anisotropic layer formed of discotic liquid crystalline molecules, the compounds contained in the optically anisotropic layer are not necessarily discotic liquid crystalline molecules The ultimate state of the optically anisotropic layer also contain compounds such that they are originally of low-molecular-weight discotic liquid crystalline molecules having a group reactive with heat or light, but undergo polymerization or crosslinking by heat or light, thereby becoming higher-molecular-weight molecules and losing their liquid crystallinity Examples of preferred discotic liquid crystalline molecules are described in Japanese Patent Application Laid-Open No 8-50206 And the details of the polymerization of discotic liquid crystalline molecules are described in Japanese Patent Application Laid-Open No 8-27284

To fix the discotic liquid crystalline molecules by polymerization, it is necessary to bond a polymerizable group, as a substitute, to the discotic core of the discotic liquid crystalline molecules Compounds in which their discotic core and a polymerizable group are bonded to each other via a linking group are preferably used With such compounds, the oriented state is maintained during the polymerization reaction Examples of such compounds include those described in Japanese Patent Application Laid-Open No 2000-155216, columns [0151] to [0168]

In hybrid orientation, the angle between the long axis (disc plane) of the discotic liquid crystalline molecules and the plane of the polarizing film increases or decreases, across the depth of the optically anisotropic layer, with increase in the distance from the plane of the polarizing film Preferably, the angle decreases with increase in the distance The possible changes in angle include continuous increase, continuous decrease, intermittent increase, intermittent decrease, change including both continuous increase and continuous decrease, and intermittent change including increase and decrease The intermittent changes include the area midway across the thickness where the tilt angle does not change Even if the change includes the area where the angle does not change, it does not matter as long as the angle increases or decreased as a whole Preferably, the angle changes continuously Generally, the average direction of the long axis of the discotic liquid crystalline molecules on the polarizing film side can be adjusted by selecting the type of discotic liquid crystalline molecules or the material for the orientation film, or by selecting the method of rubbing treatment On the other hand, generally the direction of the long axis (disc plane) of the discotic liquid crystalline molecules on the surface side (on the air side) can be adjusted by selecting the type of discotic liquid crystalline molecules or the type of the additives used together with the discotic liquid crystalline molecules Examples of additives used with the discotic liquid crystalline molecules include plasticizer, surfactant, polymerizable monomer, and polymer The degree of the change in orientation in the long axis direction can also be adjusted by selecting the type of the liquid crystalline molecules and that of additives, like the above described cases

[Other Compositions of Optically Anisotropic Layer]

Use of plasticizer, surfactant, polymerizable monomer, etc together with the above described liquid crystalline molecules makes it possible to improve the uniformity of the coating film, the strength of the film and the orientation of liquid crystalline molecules Preferably, such additives are compatible with the liquid crystalline molecules, and they can change the tilt angle of the liquid crystalline molecules or do not inhibit the orientation of the liquid crystalline molecules Examples of polymerizable monomers applicable include radically polymerizable or cationically polymerizable compounds Preferable are radically polymerizable polyfunctional monomers which are copolymerizable with the above described polymerizable-group containing liquid crystalline compounds Specific examples are those described in Japanese Patent Application Laid-Open No 2002-296423, columns [0018] to [0020] The amount of the above described compounds added is generally in the range of 1 to 50% by mass of the discotic liquid crystalline molecules and preferably in the range of 5 to 30% by mass Examples of surfactants include traditionally known compounds, however, fluorine compounds are particularly preferable Specific examples of fluorine compounds include compounds described in Japanese Patent Application Laid-Open No 2001-330725, columns [0028] to [0056]

Preferably, polymers used together with the discotic liquid crystalline molecules can change the tilt angle of the discotic liquid crystalline molecules Examples of polymers applicable include cellulose esters Examples of preferred cellulose esters include those described in Japanese Patent Application Laid-Open No 2000-155216, columns [0178] Not to inhibit the orientation of the liquid crystalline molecules, the amount of the above described polymers added is preferably in the range of 01 to 10% by mass of the liquid crystalline molecules and more preferably in the range of 01 to 8% by mass The discotic nematic liquid crystal phase-solid phase transition temperature of the discotic liquid crystalline molecules is preferably 70 to 300° C. and more preferably 70 to 170° C.

[Formation of Optically Anisotropic Layer]

An optically anisotropic layer can be formed by coating the surface of the orientation film with a coating fluid that contains liquid crystalline molecules and, if necessary, polymerization initiator or any other ingredients described later As a solvent used for preparing the coating fluid, an organic solvent is preferably used Examples of organic solvents applicable include amides (e g N,N-dimethylformamide), sulfoxides (e.g. dimethylsulfoxide), heterocycle compounds (e.g. pyridine), hydrocarbons (e.g. benzene, hexane), alkyl halides (e.g. chloroform, dichloromethane, tetrachloroethane), esters (e.g. methyl acetate, butyl acetate), ketones (e.g. acetone, methyl ethyl ketone), and ethers (e.g. tetrahydrofuran, 1,2-dimethoxyethane) Alkyl halides and ketones are preferably used Two or more kinds of organic solvent can be used in combination Such a coating fluid can be applied by a known method (e.g. wire bar coating, extrusion coating, direct gravure coating, reverse gravure coating or die coating method)

The thickness of the optically anisotropic layer is preferably 01 to 20 µm, more preferably 05 to 15 µm, and most preferably 1 to 10 µm

[Fixation of Orientation State of Liquid Crystalline Molecules]

The oriented state of the oriented liquid crystalline molecules can be maintained and fixed Preferably, the fixation is performed by polymerization Types of polymerization include heat polymerization using a heat polymerization initiator and photopolymerization using a photopolymerization initiator For the fixation, photopolymerization is preferably used Examples of photopolymerization initiators include α-carbonyl compounds (described in U.S. Pat. Nos. 2,367,661 and 2,367,670), acyloin ethers (described in U.S. Pat. No. 2,448, 828), α-hydrocarbon-substituted aromatic acyloin compounds (U.S. Pat. No. 2,722,512), multi-nucleus quinone compounds (described in U.S. Pat. Nos. 3,046,127 and 2,951, 758), combinations of triarylimidazole dimmer and p-aminophenyl ketone (described in U.S. Pat. No. 3,549,367), acridine and phenazine compounds (described in Japanese Patent Application Laid-Open No 60-105667 and U.S. Pat. No. 4,239,850), and oxadiazole compounds (described in U.S. Pat. No. 4,212,970)

The amount of the photopolymerization initiators used is preferably in the range of 001 to 20% by mass of the solid content of the coating fluid and more preferably in the range of 05 to 5% by mass Light irradiation for the polymerization of liquid crystalline molecules is preferably performed using ultraviolet light Irradiation energy is preferably in the range of 20 mJ/cm$^2$ to 50 J/cm$^2$, more preferably 20 to 5000 mJ/cm$^2$, and much more preferably 100 to 800 mJ/cm$^2$ To accelerate the photopolymerization, light irradiation may be performed under heat A protective layer may be provided on the surface of the optically anisotropic layer Combining the optical compensation film with a polarizing layer is also preferable Specifically, an optically anisotropic layer is formed on a polarizing film by coating the surface of the polarizing film with the above described coating fluid for an optically anisotropic layer As a result, thin polarlizer, in which stress generated with the dimensional change of polarizing film (distorsion×cross-sectional area×modulus of elasticity) is small, can be prepared without using a polymer film between the polarizing film and the optically anisotropic layer Installing the polarizer according to the present invention in a large-sized liquid crystal display device enables high-quality images to be displayed without causing problems such as light leakage Preferably, stretching is performed while keeping the tilt angle of the polarizing layer and the optical compensation layer to the angle between the transmission axis of the two sheets of polarizer laminated on both sides of a liquid crystal cell constituting LCD and the longitudinal or transverse direction of the liquid crystal cell Generally the tilt angle is 45° However, in recent years, transmissive-, reflective-, and semi-transmissive-liquid crystal display devices have been developed in which the tilt angle is not always 45°, and thus, it is preferable to adjust the stretching direction arbitrarily to the design of each LCD

[Liquid Crystal Display Devices]

Liquid crystal modes in which the above described optical compensation film is used will be described (TN-Mode Liquid Crystal Display Devices)

TN-mode liquid crystal display devices are most commonly used as a color TFT liquid crystal display device and described in a large number of documents The oriented state in a TN-mode liquid crystal cell in the black state is such that the rod-shaped liquid crystalline molecules stand in the middle of the cell while the rod-shaped liquid crystalline molecules lie near the substrates of the cell (OCB-Mode Liquid Crystal Display Devices)

An OCB-mode liquid crystal cell is a bend orientation mode liquid crystal cell where the rod-shaped liquid crystalline molecules in the upper part of the liquid cell and those in the lower part of the liquid cell are oriented in substantially opposite directions (symmetrically) Liquid crystal displays using a bend orientation mode liquid crystal cell are disclosed in U.S. Pat. Nos. 4,583,825 and 5,410,422 A bend orientation mode liquid crystal cell has a self-compensation function since the rod-shaped liquid crystalline molecules in the upper part of the liquid cell and those in the lower part are symmetrically oriented Thus, this liquid crystal mode is also referred to as OCB (Optically Compensatory Bend) liquid crystal mode Like in the TN-mode cell, the oriented state in an OCB-mode liquid crystal cell in the black state is also such that the rod-shaped liquid crystalline molecules stand in the middle of the cell while the rod-shaped liquid crystalline molecules lie near the substrates of the cell (VA-Mode Liquid Crystal Display Devices)

VA-mode liquid crystal cells are characterized in that in the cells, rod-shaped liquid crystalline molecules are oriented substantially vertically when no voltage is applied The VA-Mode Liquid Crystal Cells Include (1) a VA-Mode Liquid Crystal Cell in a narrow sense where rod-shaped liquid crystalline molecules are oriented substantially vertically when no voltage is applied, while they are oriented substantially horizontally when a voltage is applied (Japanese Patent Application Laid-Open No 2-176625), (2) a MVA-mode liquid crystal cell obtained by introducing multi-domain switching of liquid crystal into a VA-mode liquid crystal cell to obtain wider viewing angle, (SID 97, Digest of Tech Papers (Proceedings) 28 (1997) 845), (3) an-ASM-mode liquid crystal cell where rod-shaped liquid crystalline molecules undergo substantially vertical orientation when no voltage is applied, while they undergo twisted multi-domain orientation when a voltage is applied (Proceedings 58 to 59 (1998), Symposium, Japanese Liquid Crystal Society), and (4) a SURVIVAL-mode liquid crystal cell (reported in LCD international 98)

(IPS-Mode Liquid Crystal Display Devices)

IPS-mode liquid crystal cells are characterized in that in the cells, rod-shaped liquid crystalline molecules are oriented substantially horizontally in plane when no voltage is applied and switching is performed by changing the orientation direction of the crystal in accordance with the presence or absence of application of voltage Specific examples of IPS-mode liquid crystal cells applicable include those described in Japanese Patent Application Laid-Open Nos 2004-365941, 2004-12731, 2004-215620, 2002-221726, 2002-55341 and 2003-195333

(Other Modes of Liquid Crystal Display Devices)

In ECB-mode, STN (Supper Twisted Nematic)-mode, FLC (Ferroelectric Liquid Crystal)-mode, AFLC (Anti-ferroelectric Liquid Crystal)-mode, and ASM (Axially Symmetric Aligned Microcell)-mode cells, optical compensation can also be achieved with the above described logic These cells are effective in any of the transmissive-, reflective-, and semi-transmissive-liquid crystal display devices These are also advantageously used as an optical compensation sheet for GH (Guest-Host)-mode reflective liquid crystal display devices Examples of practical applications in which the cellulose derivative films described so far are used are described in Journal of Technical Disclosure (Laid-Open No 2001-1745, Mar. 15, 2001, issued by Japan Institute of Invention and Innovation), 45-59

Providing Antireflection Layer (Antireflection Film)

Generally an antireflection film is made up of a low-refractive-index layer which also functions as a stainproof layer, and at least one layer having a refractive index higher than that of the low-refractive-index layer (i.e. high-refractive-index layer and/or intermediate-refractive-index layer) provided on a transparent substrate Methods of forming a multi-layer thin film as a laminate of transparent thin films of inorganic compounds (e.g. metal oxides) having different refractive indices include chemical vapor deposition (CVD), physical vapor deposition (PVD), and a method in which a film of a colloid of metal oxide particles is formed by sol-gel process from a metal compound such as a metal alkoxide and the formed film is subjected to post-treatment (ultraviolet light irradiation Japanese Patent Application Laid-Open No 9-157855, plasma treatment Japanese Patent Application Laid-Open No 2002-327310)

On the other hand, there are proposed a various antireflection films, as highly productive antireflection films, which are formed by coating thin films of a matrix and inorganic particles dispersing therein in a laminated manner There is also provided an antireflection film including an antireflection layer provided with anti-glare properties, which is formed by using an antireflection film formed by coating as described above and providing the outermost surface of the film with fine irregularities The cellulose acylate film of the present invention is applicable to antireflection films formed by any of the above described methods, but particularly preferable is the antireflection film formed by coating (coating type antireflection film)

[Layer Configuration of Coating-Type Antireflection Film]

An antireflection film having at least on its substrate a layer construction of intermediate-refractive-index layer, high-refractive-index layer and low-refractive-index layer (outermost layer) in this order is designed to have a refractive index satisfying the following relationship Refractive index of high-refractive-index layer>refractive index of intermediate-refractive-index layer>refractive index of transparent substrate>refractive index of low-refractive-index layer, and a hard coat layer may be provided between the transparent substrate and the intermediate-refractive-index layer The antireflection film may also be made up of intermediate-refractive-index hard coat layer, high-refractive-index layer and low-refractive-index layer Examples of such antireflection films include those described in Japanese Patent Application Laid-Open Nos 8-122504, 8-110401, 10-300902, 2002-243906 and 2000-111706 Other functions may also be imparted to each layer There are proposed, for example, antireflection films that include a stainproofing low-refractive-index layer or antistatic high-refractive-index layer (e.g. Japanese Patent Application Laid-Open Nos 10-206603 and 2002-243906)

The haze of the antireflection film is preferably 5% or less and more preferably 3% or less The strength of the film is preferably H or higher, by pencil hardness test in accordance with JIS K5400, more preferably 2H or higher, and most preferably 3H or higher

[High-Refractive-Index Layer and Intermediate-Refractive-Index Layer]

The layer of the antireflection film having a high refractive index consists of a curable film that contains at least ultra-fine particles of high-refractive-index inorganic compound having an average particle size of 100 nm or less, and a matrix binder Fine particles of high-refractive-index inorganic compound include for example, those of inorganic compounds having a refractive index of 165 or more and preferably 19 or more Specific examples of such inorganic compounds include oxides of Ti, Zn, Sb, Sn, Zr, Ce, Ta, La or In, and composite oxides containing these metal atoms Methods of forming such ultra-fine particles include for example, treating the particle surface with a surface treatment agent (e.g. a silane coupling agent, Japanese Patent Application Laid-Open Nos 11-295503, 11-153703, 2000-9908, an anionic compound or organic metal coupling agent, Japanese Patent Application Laid-Open No 2001-310432 etc), allowing particles to have a core-shell structure in which a core is made up of high-refractive-index particle(s) (Japanese Patent Application Laid-Open No 2001-166104 etc), and using a specific dispersant together (Japanese Patent Application Laid-Open No 11-153703, U.S. Pat. No. 6,210,858B1, Japanese Patent Application Laid-Open No 2002-2776069, etc)

Materials used for forming a matrix include for example, conventionally known thermoplastic resins and curable resin films Further, as such a material, at least one composition is preferable which is selected from the group consisting of a composition including a polyfunctional compound that has at least two radically polymerizable and/or cationically polymerizable group, an organic metal compound containing a hydrolytic group, and a composition as a partially condensed product of the above organic metal compound Examples of such materials include compounds described in Japanese Patent Application Laid-Open Nos 2000-47004, 2001-315242, 2001-31871 and 2001-296401

A curable film prepared using a colloidal metal oxide obtained from the hydrolyzed condensate of metal alkoxide and a metal alkoxide composition is also preferred Examples are described in Japanese Patent Application Laid-Open No 2001-293818

The refractive index of the high-refractive-index layer is generally 170 to 220 The thickness of the high-refractive-index layer is preferably 5 nm to 10 μm and more preferably 10 nm to 1 μm The refractive index of the intermediate-refractive-index layer is adjusted to a value between the refractive index of the low-refractive-index layer and that of the high-refractive-index layer The refractive index of the intermediate-refractive-index layer is preferably 150 to 170

[Low-Refractive-Index Layer]

The low-refractive-index layer is formed on the high-refractive-index layer sequentially in the laminated manner The refractive index of the low-refractive-index layer is 120 to 155 and preferably 130 to 150

Preferably, the low-refractive-index layer is formed as the outermost layer having scratch resistance and stainproofing properties As use of significantly improving scratch resistance, it is effective to provide the surface of the layer with slip properties, and conventionally known thin film forming device that includes introducing silicone or fluorine is used The refractive index of the fluorine-containing compound is preferably 135 to 150 and more preferably 136 to 147 The fluorine-containing compound is preferably a compound that includes a crosslinkable or polymerizable functional group containing fluorine atom in an amount of 35 to 80% by mass Examples of such compounds include compounds described in Japanese Patent Application Laid-Open No 9-222503, columns [0018] to [0026], Japanese Patent Application Laid-Open No 11-38202, columns [0019] to [0030], Japanese Patent Application Laid-Open No 2001-40284, columns [0027] to [0028], Japanese Patent Application Laid-Open No 2000-284102, etc A silicone compound is preferably such that it has a polysiloxane structure, it includes a curable or polymerizable functional group in its polymer chain, and it has a crosslinking structure in the film Examples of such silicone compounds include reactive silicone (e.g. SILAPLANE manufactured by Chisso Corporation), and polysiloxane having a silanol group on each of its ends (one described in Japanese Patent Application Laid-Open No 11-258403)

The crosslinking or polymerization reaction for preparing such fluorine-containing polymer and/or siloxane polymer containing a crosslinkable or polymerizable group is preferably carried out by radiation of light or by heating simultaneously with or after applying a coating composition for forming an outermost layer, which contains a polymerization initiator, a sensitizing agent, etc A sol-gel cured film is also preferable which is obtained by curing the above coating composition by the condensation reaction carried out between an organic metal compound, such as silane coupling agent, and silane coupling agent containing a specific fluorine-containing hydrocarbon group in the presence of a catalyst Examples of such films include those of polyfluoroalkyl-group-containing silane compounds or the partially hydrolyzed and condensed compounds thereof (compounds described in Japanese Patent Application Laid-Open Nos 58-142958, 58-147483, 58-147484, 9-157582 and 11-106704), and silyl compounds that contain "perfluoroalkyl ether" group as a fluoline-containing long-chain group (compounds described in Japanese Patent Application Laid-Open Nos 2000-117902, 2001-48590 and 2002-53804)

The low-refractive-index layer can contain additives other than the above described ones, such as filler (e.g. low-refractive-index inorganic compounds whose primary particles have an average particle size of 1 to 150 nm, such as silicon dioxide (silica) and fluorine-containing particles (magnesium fluoride, calcium fluoride, barium fluoride), organic fine particles described in Japanese Patent Application Laid-Open No 11-3820, columns [0020] to [0038]), silane coupling agent, slippering agent and surfactant When located under the outermost layer, the low-refractive-index layer may be formed by vapor phase method (vacuum evaporation, spattering, ion plating plasma CVD, etc) From the viewpoint of reducing producing costs, coating method is preferable The thickness of the low-refractive-index layer is preferably 30 to 200 nm, more preferably 50 to 150 nm, and most preferably 60 to 120 nm

[Hard Coat Layer]

A hard coat layer is provided on the surface of both stretched and unstretched cellulose acylate films so as to impart physical strength to the antireflection film Particularly preferably the hard coat layer is provided between the stretched cellulose acylate film and the above described high-refractive-index layer and between the unstretched cellulose acylate film and the above described high-refractive-index layer It is also preferable to provide the hard coat layer directly on the stretched and unstretched cellulose acylate films by coating without providing an antireflection layer Preferably, the hard coat layer is formed by the crosslinking reaction or polymerization of compounds curable by light and/or heat Preferred curable functional groups are photopolymerizable functional groups, and organic metal compounds having a hydrolytic functional group are preferably organic alkoxy silyl compounds Specific examples of such compounds include the same compounds as illustrated in the description of the high-refractive-index layer Specific examples of compositions that constitute the hard coat layer include those described in Japanese Patent Application Laid-Open Nos 2002-144913, 2000-9908 and WO 0/46617

The high-refractive-index layer can also serve as a hard coat layer In this case, it is preferable to form the hard coat layer using the technique described in the description of the high-refractive-index layer so that fine particles are contained in the hard coat layer in the dispersed state The hard coat layer can also serves as an anti-glare layer (described later), if particles having an average particle size of 02 to 10 μm are added to provide the layer with the anti-glare function The thickness of the hard coat layer can be properly designed depending on the applications for which it is used The thickness of the hard coat layer is preferably 02 to 10 μm and more preferably 05 to 7 μm The strength of the hard coat layer is preferably H or higher, by pencil hardness test in accordance with JIS K5400, more preferably 2H or higher, and much more preferably 3H or higher The hard coat layer having a smaller abrasion loss in test, before and after Taber abrasion test conducted in accordance with JIS K5400, is more preferable

[Forward Scattering Layer]

A forward scattering layer is provided so that it provides, when applied to liquid crystal displays the effect of improving viewing angle when the angle of vision is tilted up-, down-, right- or leftward The above described hard coat layer can also serve as a forward scattering layer, if fine particles with different refractive index are dispersed in it Example of such layers include those described in Japanese Patent Application Laid-Open No 11-38208 where the coefficient of forward scattering is specified, those described in Japanese Patent Application Laid-Open No 2000-199809 where the relative refractive index of transparent resin and fine particles are allowed to fall in the specified range, and those described in Japanese Patent Application Laid-Open No 2002-107512 wherein the haze value is specified to 40% or higher

[Other Layers]

Besides the above described layers, a primer layer, antistatic layer, undercoat layer or protective layer may be provided

[Coating Method]

The layers of the antireflection film can be formed by any method of dip coating, air knife coating, curtain coating, roller coating, wire bar coating, gravure coating, microgravure coating and extrusion coating (U.S. Pat. No. 2,681,294)

[Anti-Glare Function]

The antireflection film may have the anti-glare function that scatters external light The anti-glare function can be obtained by forming irregularities on the surface of the antireflection film When the antireflection film has the anti-glare function, the haze of the antireflection film is preferably 3 to 30%, more preferably 5 to 20% and most preferably 7 to 20%

As a method for forming irregularities on the surface of antireflection film, any method can be employed, as long as it can maintain the surface geometry of the film Such methods include for example, a method in which fine particles are used in the low-refractive-index layer to form irregularities on the surface of the film (e.g. Japanese Patent Application Laid-Open No 2000-271878), a method in which a small amount (01 to 50% by mass) of particles having a relatively large size (0.05 to 2 μm in particle size) are added to the layer under a low-refractive-index layer (high-refractive-index layer, intermediate-refractive-index layer or hard coat layer) to form a film having irregularities on the surface and a low-refractive-index layer is formed on the irregular surface while keeping the geometry (e.g. Japanese Patent Application Laid-Open Nos 2000-281410, 2000-95893, 2001-100004, 2001-281407), a method in which irregularities are physically transferred on the surface of the outermost layer (stainproofing layer) having been provided(e.g. embossing described in Japanese Patent Application Laid-Open Nos 63-278839, 11-183710, 2000-275401)

[Applications]

The unstretched and stretched cellulose acylate films of the present invention are useful as optical films, particularly as polarizer protective film, optical compensation sheet (also referred to as retardation film) for liquid crystal displays, optical compensation sheet for reflection-type liquid crystal displays, and substrate for silver halide photographic photosensitive materials In the following the measurement methods used in the present invention will be described (1) Modulus of Elasticity Modulus of elasticity was obtained by measuring the stress in the 05% stretching at a stress rate of 10%/min in an atmosphere of 23° C., 70% rh Measurement was made in the MD and TD directions and the average of the measurements was used as modulus of elasticity (2) Substitution Degree of Cellulose Acylate The substitution degree of the acyl groups of cellulose acylate and that of the acyl groups at 6-position were obtained by the method described in Carbohydr Res 273 (1995) 83-91 (Tedzuka et al), using $^{13}$C-NMR (3) Residual Solvent Samples were prepared in which 300 mg of sample film is dissolved in 30 ml of methyl acetate (sample A) and in which 300 mg of sample film was dissolved in 30 ml of dichloromethane (sample B)

Measurement was made for these samples by gas chromatography (GC) under the following conditions Column DB-WAX (025 mmφ×30 m, film thickness 025 μm)

Column temperature 50° C.

Carrier gas nitrogen

Analysis time 15 minutes

Amount of sample injected 1 μml

The amount of the solvent used was determined the following process

For sample A, from the peaks other than that of the solvent (methyl acetate), the contents were obtained using a calibration curve, and the sum of the contents was expressed by Sa For sample B, from the peaks which were hidden in sample A due to the peaks of the solvent, the contents were obtained using a calibration curve, and the sum of the contents was expressed by Sb The sum of Sa and Sb was used as the amount of residual solvent (4) Loss in Weight on Heat at 220° C.

The sample was heated from room temperature to 400° C. at a heating rate of 10° C./min in an atmosphere of nitrogen using TG-DTA 2000S manufactured by MAC Science, and the weight change of 10 mg of the sample at 220° C. was used as the loss in weight on heat at 220° C.

(5) Melt Viscosity

Melt viscosity was measured using viscoelasticity measuring equipment with a corn plate (e.g. modular compact rheometer Physica MCR301 manufactured by Anton Paar) under the following conditions The resin was fully dried so that its water content is 01% or less, and the melt viscosity was measured at a gap of 500 μm, temperature of 220° C. and shear rate of 1 (/sec)

(6) Re and Rth

Samples were collected at 10 points at fixed intervals across the width of the film The samples underwent moisture conditioning at 25° C., 60% rh for 4 hours Then, the retardations at wavelength of 590 nm were measured by an automatic double refraction meter (KOBRA-21ADH/PR manufactured by Ouji Science Instrument) at 25° C., 60% rh while allowing light to enter the film from the direction inclined at angles of +50° to −50° in increments of 10° C. to the direction normal to the film using the slow axis in plane as a rotational axis in-plane And the retardation (Re) and across-the-thickness retardation (Rth) were calculated using the measurements In the following the features of the present invention will be described in further detail by examples and comparative examples 1t is to be understood that various changes in the materials used, the amount, proportion and treatment of the same, the treatment procedure for the same, etc may be made without departing from the spirit of the present invention Accordingly, it is also to be understood that the scope of the present invention is not limited to the following examples

EXAMPLES

1 Thermoplastic Resin

A cellulose acylate resin, saturated norbornene resin or polycarbonate resin was used in each example, as shown in the tables of FIGS. 5A and 5B For the saturated norbornene resin, fine particles having such a particle size as shown in the tables of FIGS. 5A and 5B were added The glass transition temperature of each thermoplastic resin (Tg) was determined in the manner described below The determinations are shown in the tables of FIGS. 5A and 5B Twenty mg of each sample was placed on the sample pan of DSC The sample was heated, in a stream of nitrogen, from 30° C. to 250° C. at a heating rate of 10° C./min (1st-run) and then cooled to 30° C. at a cooling rate of −10° C./min Then, the sample was again heated from 30° C. to 250° C. (2nd-run) The temperature at which the baseline started to drift on the low temperatures side in the 2nd-run was taken as the glass transition temperature of the sample (Tg) 005% by mass of silicon dioxide fine particles (Aerosil R972V) was added to each level of sample 2 Film Formation

[Melt Film Formation]

Each of the above described thermoplastic resins was formed into cylindrical pellets 3 mm in diameter and 5 mm in length Each of the thermoplastic resins in the form of pellets was dried in a vacuum drier at 110° C. so that its water content was 01% or less, and the dried resin was fed into a hopper with its temperature adjusted to Tg-10° C. The melting temperature of the resin was adjusted so that its melting viscosity was 1000 Pa s And the resin was molten in a single screw extruder whose temperature was set at 210° C. and extruded in the form of a sheet from a T-die 12 whose temperature was set at the same temperature as the melting temperature of the resin upon a cooling drum whose temperature was set at (Tg-5)° C., where it was cooled and solidified to give an unstretched thermoplastic resin film At this operation, static electricity was applied to each solidified resin (a wire of 10 kV was positioned 10 cm apart from the point of the cooling drum where the molten resin was landed) The solidified sheet was stripped off from the cooling drum, underwent longitudinal and transverse stretching at the percent of stretch shown in the tables of FIGS. 5A and 5B (including 0 percent of stretch), and wound up Both ends (3% of the total width for each) of the sheet underwent trimming right before the winding up and then underwent knurling 10 mm wide and 50 μm high The sheet thus obtained was 15 m wide and wound up at a wind-up rate of 30 m/min to a 3000 m-roll in each example and each comparative example

[Solution Film Formation]

A hundred parts by weight of thermoplastic resin was dried so that its water content was 01% by weight or less, and the dried thermoplastic resin and additives were introduced into a solvent under stirring On completing the introduction, stirring was stopped, and the thermoplastic resin was allowed to swell at 25° C. for 3 hours to prepare a slurry The slurry was stirred again to completely dissolve the thermoplastic resin in the solvent Then, the slurry was filtered through filter paper with absolute filtering rating of 001 mm (#63 manufactured by Toyo Roshi Kaisha, Ltd) and further filtered through filter paper with absolute filtering rating of 3 μm (FH025 manufactured by PALL Corporation) The above dope was warmed to 35° C. and cast by the drum method described below The dope was cast through a die upon a mirror-finished stainless drum 3 m in diameter whose temperature was set at −15° C. The die used was of a type similar to one described in Japanese Patent Application Laid-Open No 11-314233 The casting speed was 100 m/min and the casting width was 250 cm The cast dope was stripped off when the residual solvent content in the dope was 200% by weight and dried at 130° C. After the residual solvent content was 1% by weight or less, the sheet underwent longitudinal and transverse stretching at the percent of stretch shown in the tables of FIGS. 5A and 5B (including 0 percent of stretch) and wound up Both ends (3% of the total width for each) of the sheet underwent trimming right before the winding up and then underwent knurling 10 mm wide and 50 μm high The sheet thus obtained was 15 m wide and wound up at a wind-up rate of 30 m/min to a 3000 m-roll in each example and each comparative example 3 Stretching The above thermoplastic resin films obtained by the melt film forming process and the solution film forming process were unstretched (the percent of stretch was 0% in both longitudinal stretching and transverse stretching)

4 Heat Treatment Conditions

Then, heat treatment was carried out under the heat treatment conditions shown in the tables of FIGS. 5A and 5B (heat treatment temperature, conveying tension during heat treatment and heat treatment time)

5 Evaluation of Films

The Re, Rths of the resultant films before wet or dry heat treatment (fresh films), fine retardation non-uniformity, the changes in Re, Rth of the films by wet heat treatment (δRe(w), δRth(w)), the changes in Re, Rth by dry heat treatment (δRe(d), δRth(d)), and the fine retardation non-uniformity of the films were determined The determinations are shown in the tables of FIGS. 5A and 5B The Re of each film is shown in a positive number when the film has a slow axis in the direction of running during the film formation The cellulose acylate resins of Examples 1 to 8 and Comparative Examples 1 to 3 shown in the tables of FIGS. 5A and 5B are of the same type The same is true for the saturated norbornene resins of Examples 14 to 17 and Comparative Example 4 and the polycarbonate resins of Example 18 and Comparative Example 5

The results in the table of FIGS. 5A and 5B show that in the films of Examples 1 to 18 where heat treatment was carried out under the conditions that satisfy the conditions according to the present invention a tension of 2 N/cm$^2$ or higher and 50 N/cm$^2$ or lower, a temperature of Tg° C. or higher and (Tg+50)° C. or lower, and a time of 10 seconds or longer and 600 seconds or shorter, thereby reducing the in-plane retardation (Re) and retardation in the thickness direction (Rth) of the films, the difference in retardations (Re, Rth) before and after the heat treatment was large, and the retardations (Re, Rth) were desirably made close to 0 nm In contrast, in the films of Comparative Examples 1, 4 and 5 where the heat treatment time was as short as 8 seconds, the film of Comparative Example 2 where the heat treatment temperature was as low as 127° C. and the film of Comparative Example 3 where the conveying tension was as high as 60 N/cm$^2$, the retardations (Re, Rth) were not desirably made close to 0 nm The films of Examples 9 to 13 were produced by the production method of the present invention using cellulose acylate having substitution degrees different from those of the films of Examples 1 to 8 The results show that the present invention is applicable to various types of cellulose acylate regardless of melt film forming process or solution film forming process The results in the table of FIGS. 5A and 5B also show that for the changes in retardations by wet heat treatment and dry heat treatment (δRe(w), δRth(w), δRe(d), δRth(d)) or fine retardation non-uniformity, good results were produced, compared with the films of Examples 16 and 17, in the films of Examples 14 and 15 where fine particles with an average particle size of 01 μm or larger and 30 μm or smaller were added to the saturated norbornene resin at a concentration of 1 ppm or higher and 10000 ppm or lower 6 Preparation of Sheet Polarizer (1) Surface Treatment The thermoplastic resin films shown in the table of FIGS. 5A and 5B were saponified by the following immersion-saponification process The same results as in the immersion-saponification process were obtained when the films were saponified by the coating-saponification process described below (i) Immersion-Saponification Process As a saponifying solution, 15 N NaOH aqueous solution was used The temperature of the solution was adjusted to 60° C., and each thermoplastic resin film was immersed in the solution for 2 minutes Then, the film was immersed in 01 N aqueous solution of sulfuric acid for 30 seconds and passed through a water washing bath (ii) Coating-Saponification Process To 80 parts by weight of isopropanol, 20 parts by weight of water was added, and KOH was dissolved in the above mixed solution so that the normality of the solution was 15 The temperature of the solution was adjusted to 60° C. and used as a saponifying solution The saponifying solution was coated on the thermoplastic resin film at 60° C. in an amount of 10 g/m$^2$ to allow the thermoplastic resin film to undergo saponification for 1 minute Then, the saponified thermoplastic resin film was washed with warm water spray at 50° C. at a spraying rate of 10 L/m$^2$ min for 1 minute (2) Preparation of Polarizing Layer A polarizing layer 20 μm thick was prepared by creating a difference in peripheral velocity between two pairs of nip rolls to carry out stretching in the longitudinal direction in accordance with Example 1 described in Japanese Patent Application Laid-Open No 2001-141926 A polarizing layer was also prepared by carrying out stretching in such a manner that the stretching axis was tilted at 45°, just like in Example 1 described in Japanese Patent Application Laid-Open No 2002-86554, but the evaluations were the same as those of the sheet polarizer prepared using the above described polarizing layer (3) Stacking The polarizing layer thus obtained and the thermoplastic resin film which was formed, stretched and saponified as above were stacked using a 3% PVA aqueous solution (PVA-117H, manufactured by Kuraray Co, Ltd), as an adhesive, so that sheets of polarizer having the following structures were prepared Fujitack (TD80, manufactured by Fuji Photo film Co, Ltd), described below, was also saponified by the above described process Sheet polarizer A unstretched thermoplastic resin film/ polarizing layer/Fujitack Sheet polarizer B unstretched thermoplastic resin film/ polarizing layer/unstretched thermoplastic resin film Each of the sheets of polarizer, as fresh products, thus obtained, the sheets of polarizer having undergone wet heat treatment (60° C., 90% rh for 500 hours) and the sheets of polarizer having undergone dry heat treatment (80° C., dry, for 500 hours) was mounted on a 20-inch VA-mode liquid crystal display as shown in FIGS. 2 to 9 of Japanese Patent Application Laid-Open No 2000-154261, with stretched cellulose acylate on the liquid crystal side A comparison was made among the LCD displays where either one of the sheets of polarizer A and B, as fresh products, was used, the LCD displays where either one of the sheets of polarizer A and B having undergone dry heat treatment and the LCD displays where either one of the sheets of polarizer A and B having undergone wet heat treatment The films were evaluated by visual observation of color non-uniformity occurring in the liquid crystal displays and graded according to four ranks based on the percentage of the color-non-uniformity area to the entire display area The results are shown in the tables of FIGS. 5A and 5B The films which produced no color non-uniformity and no problem were judged Very Good, the films which produced almost no color non-uniformity and no problem were judged Good, the films which produced a little color non-uniformity were judged Fair, and the films which produced color non-uniformity on the entire display area were judged Poor As is apparent from the tables of FIGS. 5A and 5B, the films of Examples 1 to 18, which embodied the present invention, had a good performance Particularly in the films of Examples 1 to 11 produced using cellulose acylate resins in which the substitution degree of acylate group satisfied the following expressions $20 \leq X+Y \leq 30$, $0 \leq X \leq 20$, $12 \leq Y \leq 29$, good results were obtained, compared with the films of Examples 12 and 13 in which the substitution degree of acylate group did not satisfy the above expressions In the films of Examples 14 and 15 produced using saturated norborene resins which contained fine particles with an average particle size of 01 μm or larger and 30 μm or smaller at a concentration of 1 ppm or higher and 10000 ppm or lower, good results were obtained, compared with the films of Examples 16 and 17 which contained fine particles whose average particle size and concentration were outside the above described range 7 Preparation of Optical Compensation Film Optical compensation films were prepared using the stretched thermoplastic resin films of the present invention, instead of the cellulose acetate film of Example 1 described in Japanese Patent Application Laid-Open No 11-316378 whose surface was coated with a liquid crystal layer A comparison was made among the optical compensation films prepared using the thermoplastic resin films right after forming and stretching (fresh products), those prepared using the thermoplastic films having undergone wet heat treatment (60° C., 90% rh, for 500 hours) and those prepared using the thermoplastic films having undergone dry heat treatment (80° C., dry, for 500 hours) And the optical compensation films were evaluated by visual observation of the color non-uniformity occurring area The optical compensation films prepared using the stretched thermoplastic resin films of the present invention were judged good Optical compensation films were also prepared using the stretched thermoplastic resin films of the present invention, instead of the cellulose acetate film of Example 1 described in Japanese Patent Application Laid-Open No 7-333433 whose surface was coated with a liquid crystal layer The resultant optical compensation films were also judged good, just like the case described above 8 Preparation of Low Reflection Film Low reflection films were prepared using the stretched thermoplastic resin films of the present invention in accordance with Example 47 described in Journal of Technical Disclosure (Laid-Open No 2001-1745) issued by Japan Institute of Invention and Innovation The prepared low reflection films had a good optical performance 9 Preparation of Liquid Crystal Display Device The above described sheets of polarizer of the present invention were used in the liquid crystal display described in Example 1 of Japanese Patent Application Laid-Open No 10-48420, for the optically anisotropic layer containing discotic liquid crystal molecules and for the alignment film whose surface was coated with polyvinyl alcohol described in Example 1 of Japanese Patent Application Laid-Open No 9-26572, in the 20-inch VA-mode liquid crystal display described in FIGS. 2 to 9 of Japanese Patent Application Laid-Open No 2000-154261, in the 20-inch OCB-mode liquid crystal display described in FIGS. 10 to 15 of Japanese Patent Application Laid-Open No 2000-154261, and in the IPS-mode liquid crystal display described in FIG. 11 of Japanese Patent Application Laid-Open No 2004-12731 Furthermore, the low reflection films of the present invention were stacked on the outermost surface of the above described liquid crystal displays Good liquid crystal display devices were obtained

The invention claimed is:

1. A method for producing a thermoplastic resin film, comprising a step of:
heat treating an unstretched thermoplastic resin film not having undergone stretching treatment in a stretching step, at a glass transition temperature of the thermoplastic resin Tg° C. or higher and (Tg+50)° C. or lower for 10 seconds or longer and 600 seconds or shorter while conveying the thermoplastic resin film at a low tension of 2 N/cm² or higher and 50 N/cm² or lower,
whereby an occurrence of an in-plane retardation (Re) and a retardation in the thickness direction (Rth) in the thermoplastic resin film is prevented by this step, and the thermoplastic resin film after the heat treatment has |Re| of 0 to 10 nm and |Rth| of 0 to 20 nm.

2. The method for producing a thermoplastic resin film according to claim 1, wherein
the thermoplastic resin film after the heat treatment has a change in Re by wet heat (δRe(w)), a change in Re by dry heat (δRe(d)), a change in Rth by wet heat (δRth(w)) and a change in Rth by dry heat (δRth(d)) of 0% or more and 10% or less, respectively.

3. The method for producing a thermoplastic resin film according to claim 1, wherein
the thermoplastic resin film after the heat treatment has a fine retardation non-uniformity of 0% or more and 10% or less.

4. The method for producing a thermoplastic resin film according to claim 1, wherein the thermoplastic resin is a cellulose acylate resin.

5. The method for producing a thermoplastic resin film according to claim 4, wherein the cellulose acylate resin has a substitution degree of acylate group satisfying the following formulas:

$2.0 \leq X+Y \leq 3.0$, $0 \leq X \leq 2.0$, and $1.2 \leq Y \leq 2.9$, in which X represents a substitution degree of acetyl group, and Y represents a total substitution degree of propionyl group, butyryl group, pentanoyl group and hexanoyl group.

6. The method for producing a thermoplastic resin film according to claim 1, wherein the thermoplastic resin is a saturated norbornene resin.

7. The method for producing a thermoplastic resin film according to claim 6, wherein the thermoplastic resin film contains fine particles having an average particle size of 0.1 μm or larger and 3.0 μm or smaller at a concentration of 1 ppm or more and 10000 ppm or less.

8. The method for producing a thermoplastic resin film according to claim 1 wherein the thermoplastic resin is a polycarbonate resin.

9. A thermoplastic resin film, wherein the film is produced by the production method according to claim 1.

10. A sheet polarizer, comprising at least one stacked layer of the thermoplastic resin film according to claim 9.

11. An optical compensation film for liquid crystal display panels, comprising, as a substrate, the thermoplastic resin film according to claim 9.

12. An antireflection film, comprising, as a substrate, the thermoplastic resin film according to claim 9.

13. The method of producing a thermoplastic resin film according to claim 1, wherein the in-plane retardation (Re) and the retardation in the thickness direction (Rth) in the unstretched thermoplastic resin film before heat treatment has Re of −10 to 80 nm, and Rth of 0 to 80 nm, respectively, when the film longitudinal direction is a slow axis.

* * * * *